(12) United States Patent
Kawabe

(10) Patent No.: US 10,629,235 B2
(45) Date of Patent: Apr. 21, 2020

(54) MAGNETIC DISK DEVICE AND READ/WRITE PROCESSING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Takayuki Kawabe, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/266,140

(22) Filed: Feb. 4, 2019

(65) Prior Publication Data
US 2019/0362752 A1    Nov. 28, 2019

(30) Foreign Application Priority Data
May 22, 2018    (JP) .................................. 2018-097935

(51) Int. Cl.
*G11B 5/09*    (2006.01)
*G11B 5/596*    (2006.01)
*G11B 20/12*    (2006.01)

(52) U.S. Cl.
CPC ...... *G11B 5/59633* (2013.01); *G11B 20/1217* (2013.01); *G11B 2020/1238* (2013.01); *G11B 2020/1292* (2013.01)

(58) Field of Classification Search
None
See application file for complete search history.

(56) References Cited

U.S. PATENT DOCUMENTS

| | | | | |
|---|---|---|---|---|
| 6,058,099 A * | 5/2000 | Senshu | ............. | G11B 7/00745 369/275.3 |
| 7,859,784 B2 * | 12/2010 | Ogawa | .................. | G11B 5/012 360/31 |
| 8,885,284 B2 * | 11/2014 | Kashiwagi | ............. | G11B 5/596 360/75 |
| 9,378,763 B1 | 6/2016 | Kim et al. | | |
| 9,412,403 B1 | 8/2016 | Dhanda et al. | | |
| 9,437,232 B1 | 9/2016 | Galbraith et al. | | |
| 2004/0223435 A1 * | 11/2004 | Nishi | .................. | G11B 7/0053 369/53.2 |
| 2014/0118857 A1 * | 5/2014 | Kashiwagi | ............. | G11B 5/596 360/75 |

FOREIGN PATENT DOCUMENTS

JP    2014-89780 A    5/2014

* cited by examiner

*Primary Examiner* — Peter Vincent Agustin
(74) *Attorney, Agent, or Firm* — White & Case LLP

(57) ABSTRACT

According to one embodiment, a magnetic disk device includes a disk, a head configured to write data to the disk and read data from the disk, and a controller configured to write position information of the head when writing a first track of the disk and a second track partially overlapping with the first track in a first region of the first track at which read processing on the first track is started.

16 Claims, 20 Drawing Sheets

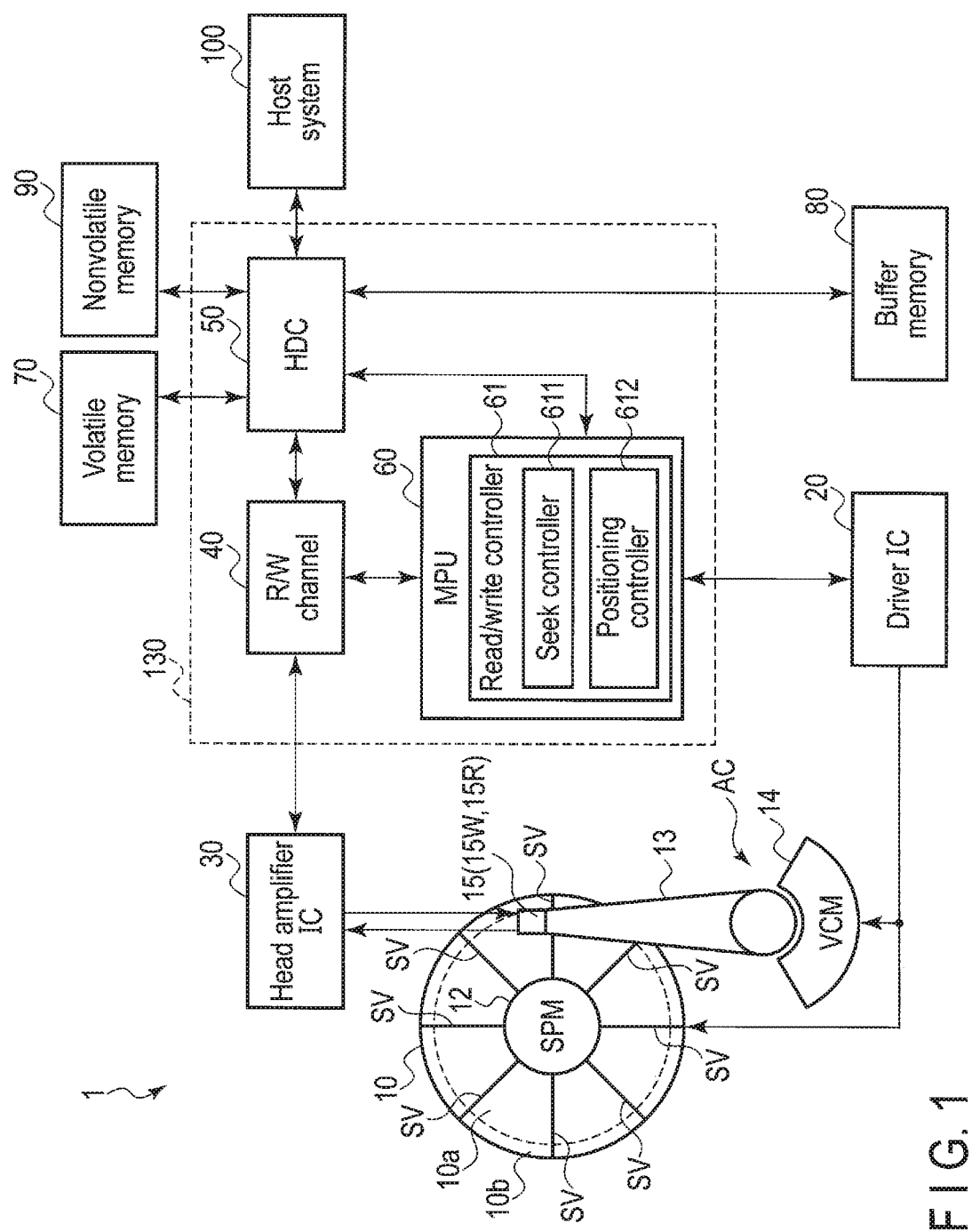
F I G. 1

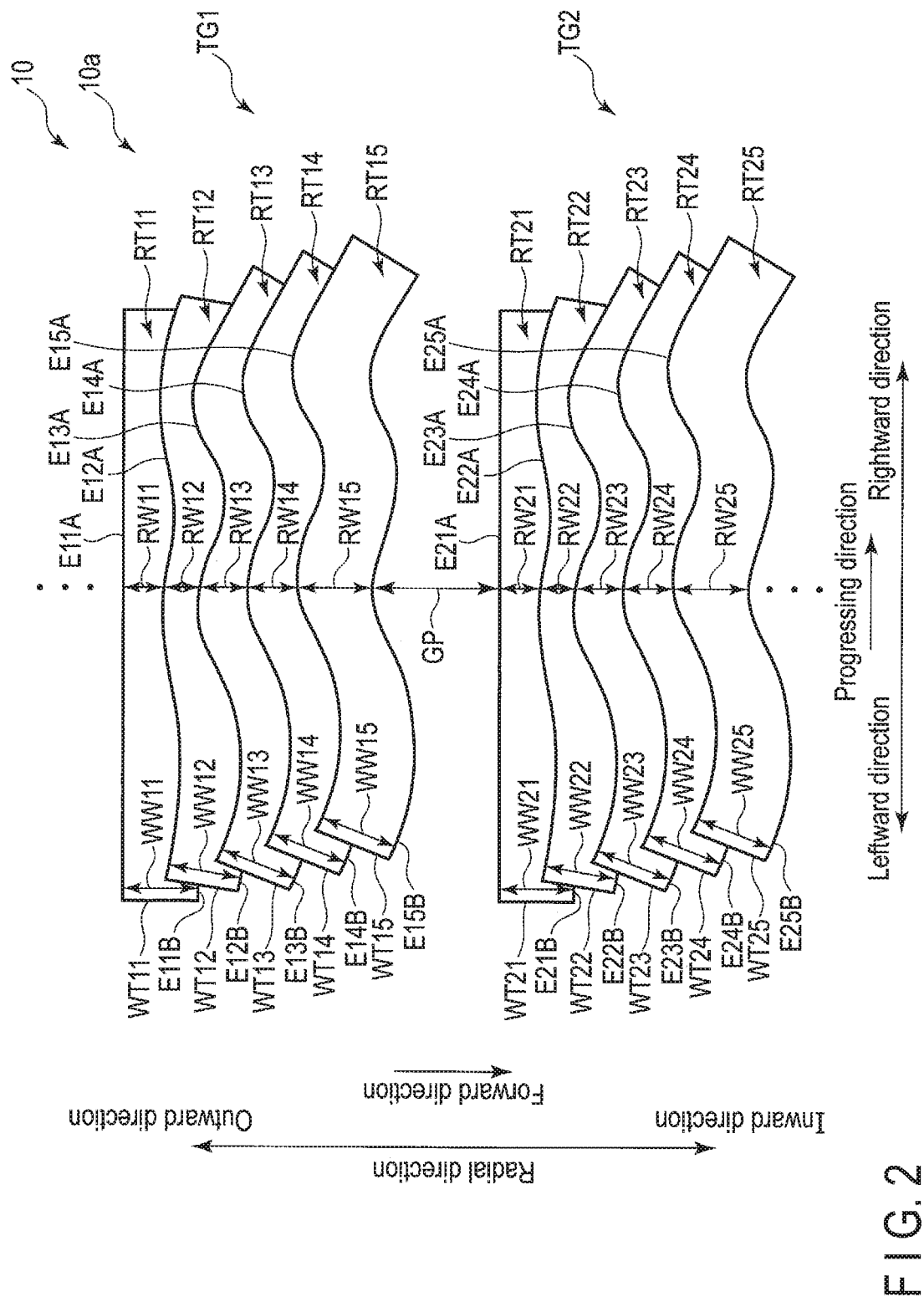
F I G. 2

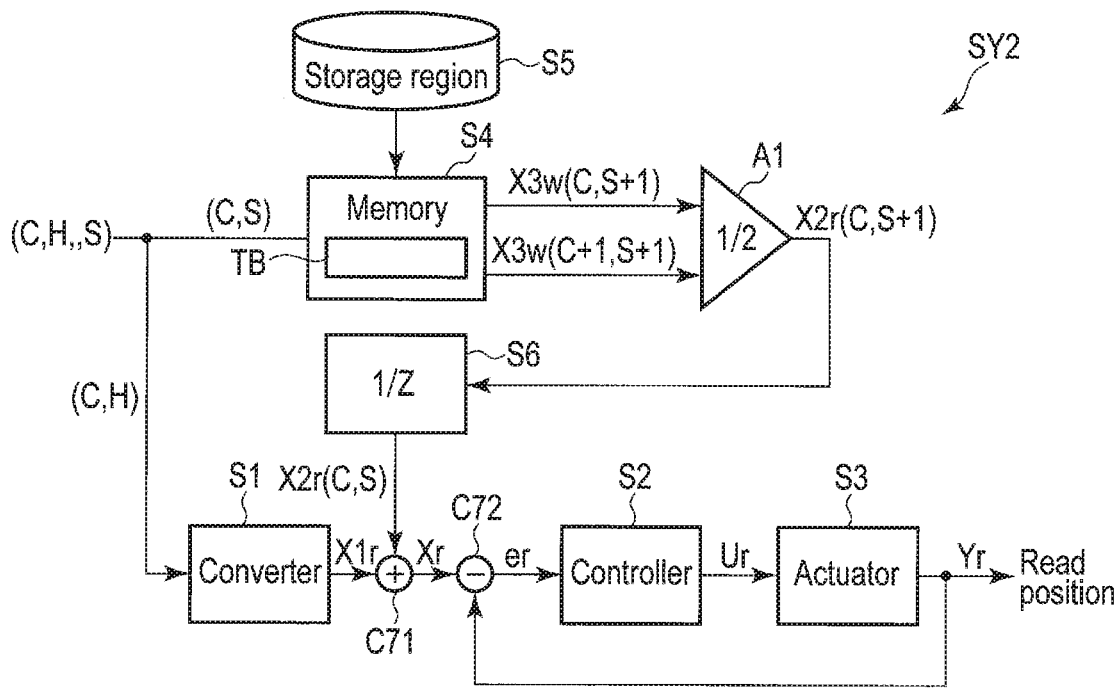
F I G. 7
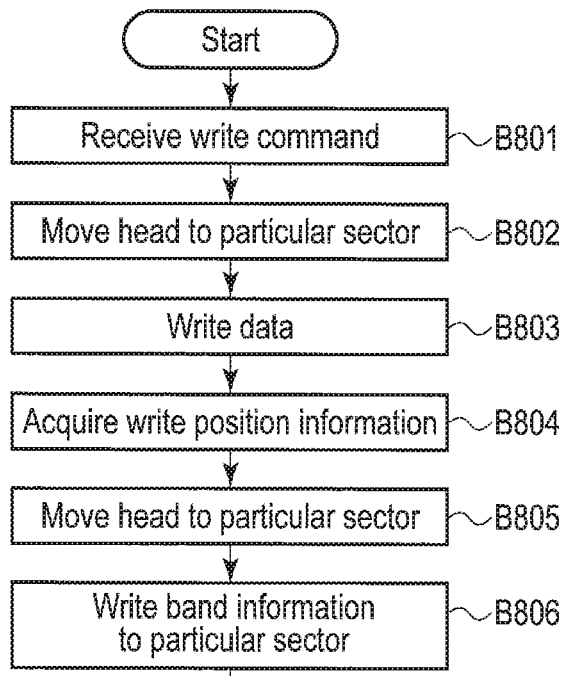
F I G. 8

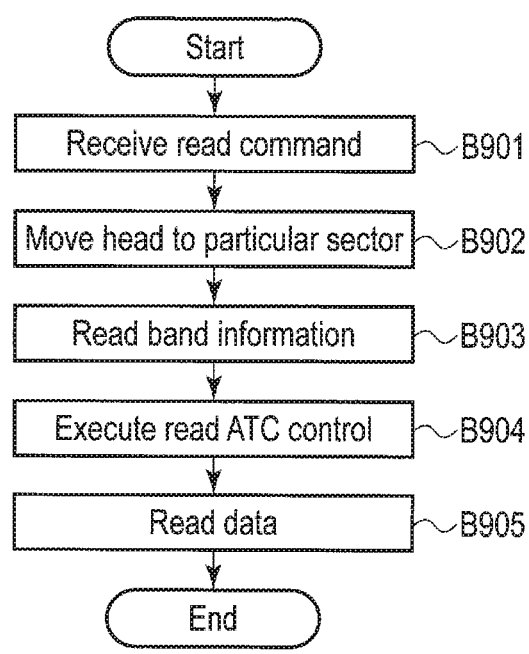
F I G. 9

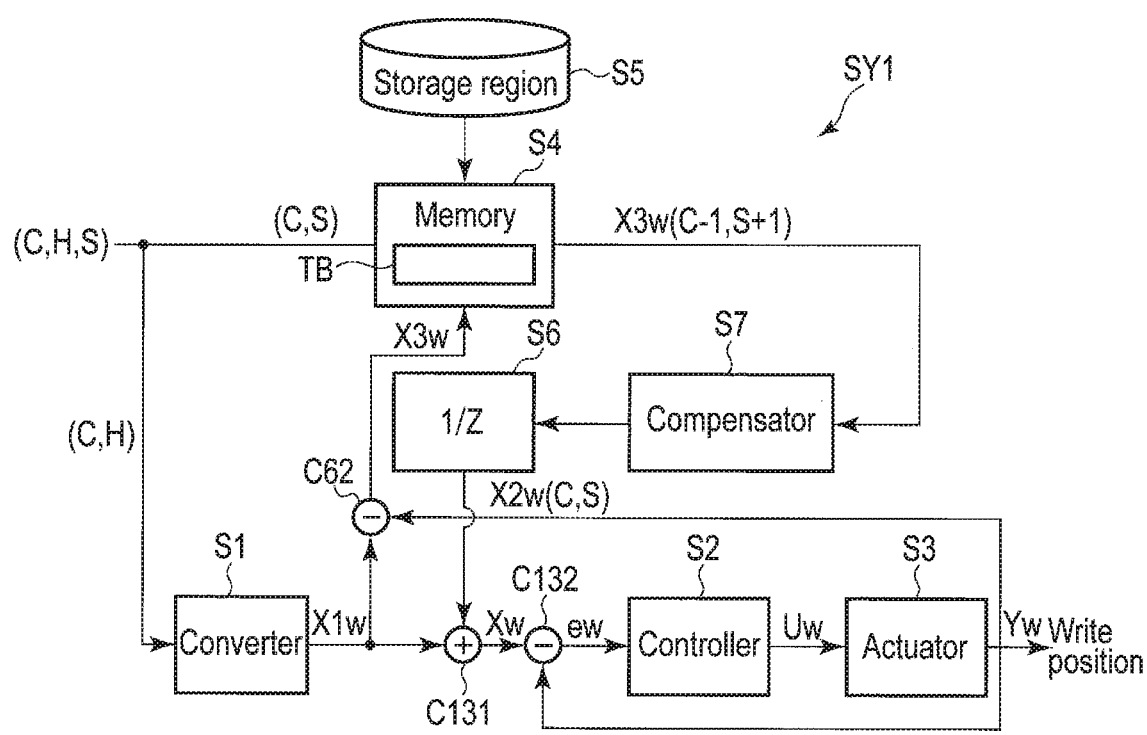
F I G. 13

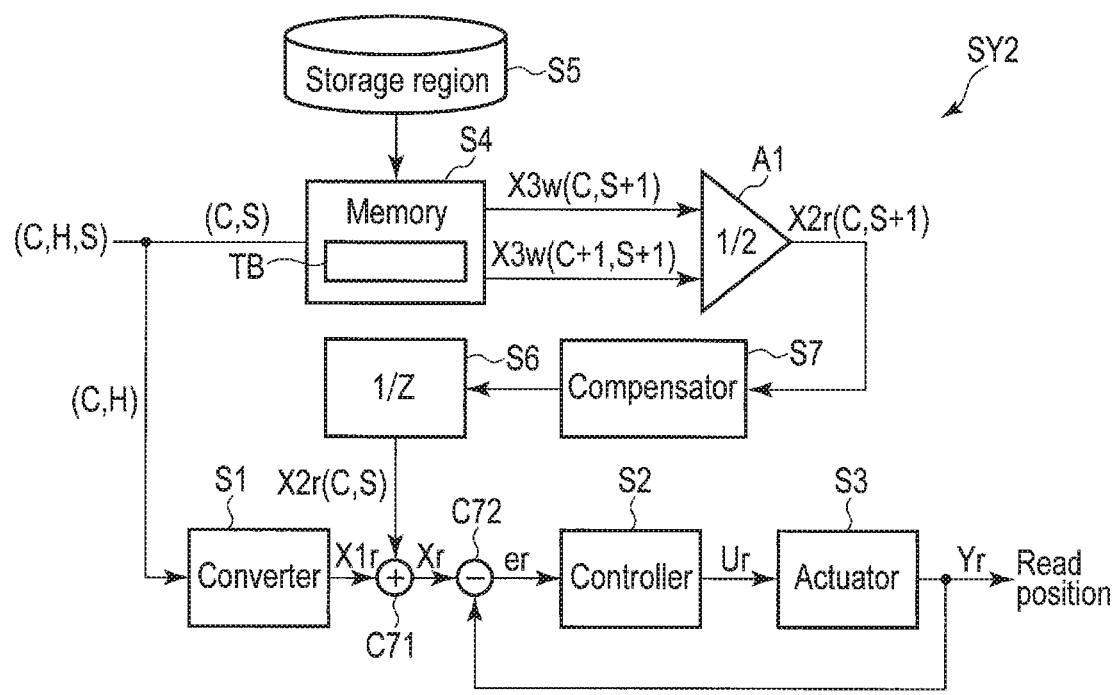
F I G. 16

MAGNETIC DISK DEVICE AND READ/WRITE PROCESSING METHOD

CROSS-REFERENCE TO RELATED APPLICATIONS

This application is based upon and claims the benefit of priority from Japanese Patent Application No. 2018-097935, filed May 22, 2018, the entire contents of which are incorporated herein by reference.

FIELD

Embodiments described herein relate generally to a magnetic disk device and a read/write processing method.

BACKGROUND

In recent years, various techniques for realizing high recording capacity of a magnetic disk device have been developed. One of the techniques is a recording technique called shingled write magnetic recording (SMR) or shingled write recording (SWR). The SMR magnetic disk device writes a subsequent recording track to overlap with a part of a track adjacent thereto (hereinafter referred to as an adjacent track) at the time of writing data to the magnetic disk. In the SMR magnetic disk device, a width of the overwritten track may be narrower than a width of a track that has not been overwritten.

BRIEF DESCRIPTION OF THE DRAWINGS

FIG. 1 is a block diagram illustrating a configuration of a magnetic disk device according to a first embodiment;

FIG. 2 is a schematic diagram illustrating an example of an SMR region in which data is written;

FIG. 7 is a block diagram illustrating an example of a head positioning control system during read processing according to the first embodiment;

FIG. 8 is a flowchart illustrating an example of a write processing method according to the first embodiment;

FIG. 9 is a flowchart illustrating an example of a read processing method according to the first embodiment;

FIG. 13 is a block diagram illustrating an example of a head positioning control system during write processing according to a second embodiment;

FIG. 16 is a block diagram illustrating an example of a head positioning control system during read processing according to a first modification;

DETAILED DESCRIPTION

Figure 3:
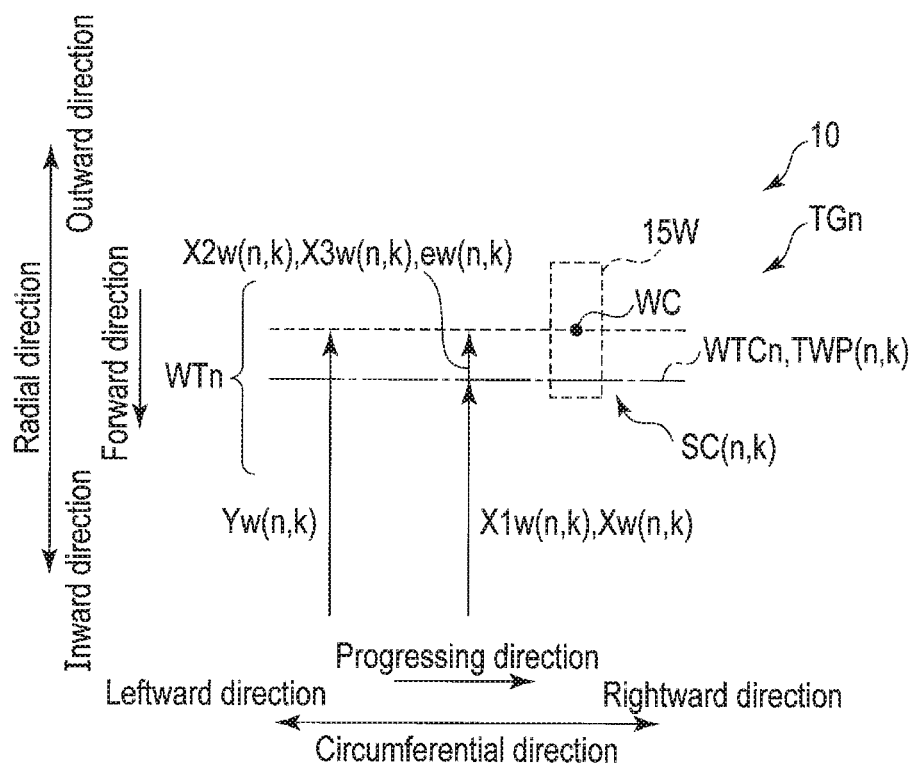
FIG. 3 is a schematic diagram illustrating an example of write processing according to the first embodiment.

In general, according to one embodiment, a magnetic disk device comprises: a disk; a head configured to write data to the disk and read data from the disk; and a controller configured to write position information of the head when writing a first track of the disk and a second track partially overlapping with the first track in a first region of the first track at which read processing on the first track is started.

According to another embodiment, a read/write processing method that is applied to a magnetic disk device comprising a disk and a head configured to write data to the disk and read data from the disk, the read/write processing method comprises writing position information of the head when writing a first track of the disk and a second track partially overlapping with the first track in a first region of the first track at which read processing on the first track is started.

Embodiments will be described with reference to the drawings hereinafter. Incidentally, the drawings are merely examples and do not limit the scope of the invention.

First Embodiment

FIG. 1 is a block diagram illustrating a configuration of a magnetic disk device 1 according to an embodiment.

The magnetic disk device 1 includes a head disk assembly (HDA) to be described later, a driver IC 20, a head amplifier integrated circuit (hereinafter, a head amplifier IC or a preamplifier) 30, a volatile memory 70, a buffer memory (buffer) 80, a nonvolatile memory 90, and a system controller 130 which is a single-chip integrated circuit. In addition, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, a voice coil motor (hereinafter referred to as a VCM) 14. The disk 10 is attached to the SPM 12 and rotates by drive of the SPM 12. The arm 13 and the VCM 14 constitute an actuator AC. The actuator AC controls movement of the head 15 mounted on the arm 13 to a particular position on the disk 10 by drive of the VCM 14. The number of the disk 10 and the head 15 may be two or more.

In the disk 10, a shingled magnetic recording (SMR) region 10a and a media cache region 10b are allocated as data regions. Hereinafter, a direction orthogonal to a radial direction of the disk 10 is referred to as a circumferential direction. The disk 10 has a plurality of servo regions SV each including servo data and the like. The plurality of servo regions SV is radially extended in the radial direction of the disk 10 and is discretely arranged with a particular gap in the circumferential direction. That is, the plurality of servo regions SV is arranged along each track to be written on the disk 10. Hereinafter, the servo region SV in each track is referred to as a servo sector in some cases.

User data or the like that has been requested to be written from the host 100 is recorded in the SMR region 10a. The media cache region 10b can be used as a cache of the SMR region 10a. In the SMR region 10aa track to be written next is overwritten on a part of a track. Therefore, a track per inch (TPI) of the SMR region 10a is higher than a TPI of the recording region that has not been overwritten. In the SMR region 10a, a plurality of track groups each including a plurality of tracks, which has been overwritten, is arranged with a gap therebetween. Hereinafter, a track group including a plurality of overwritten tracks is referred to as a band region. The band region includes at least one track in which a part of a track adjacent thereto in the radial direction (hereinafter referred to as an adjacent track) is overwritten, and a track which has been overwritten last (last track). The last track is not partially overwritten with another track, and thus, has a wider track width than a partially overwritten track. Hereinafter, a track which has been written to the disk 10 is referred to as a write track. The remaining region of the write track except for a region where an adjacent track has been overwritten is referred to as a read track. In addition, the write track may be simply referred to as a track, the read track may be simply referred to as a track, or the write track and the read track may be collectively referred to simply as a track in some cases. A track includes a plurality of sectors. Incidentally, the "track" is used as data extending in the circumferential direction of the disk 10, a region extending in the circumferential direction of the disk 10, a locus or a path (operation path) of the head 15, and various other meanings. The "sector" is used as a particular region of a track, for example, data written in the sector, a particular region of a track, and various other meanings. In addition, a width in the radial direction of the write track may be referred to as a write track width, and a width in the radial direction of the read track may be referred to as a read track width in some cases. The write track width and the read track width may be collectively referred to as a track width in some cases.

FIG. 2 is a schematic diagram illustrating an example of a SMR region 10a in which data has been written. In FIG. 2, the vertical axis indicates the radial direction of the disk 10, and the horizontal axis indicates the circumferential direction of the disk 10. In the radial direction, a direction toward the center of the disk 10 is referred to as an inward direction, and a direction opposite to the inward direction is referred to as the outward direction. In the radial direction, a direction from an inner circumference to an outer circumference of the disk 10 is defined as the outward direction (outer side), and a direction opposite to the outward direction is defined as an inward direction (inner side). In addition, a direction in which data is written and read is referred to as a forward direction in the radial direction. In the example illustrated in FIG. 2, the forward direction is the same direction as the inward direction. Incidentally, the forward direction may be the same direction as the outward direction. In the circumferential direction, one direction is defined as a rightward direction, and a direction opposite to the rightward direction is defined as a leftward direction. In addition, a direction in which data is written and read in the circumferential direction is referred to as a progressing direction. For example, the progressing direction is a direction opposite to a rotating direction of the disk 10. In the example illustrated in FIG. 2, the progressing direction is the same direction as the rightward direction. Incidentally, the progressing direction may be the same direction as the leftward direction.

In the example illustrated in FIG. 2, the SMR region 10a includes a band region TG1 and a band region TG2. In FIG. 2, for convenience of description, the tracks in the band regions TG1 and TG2 are illustrated as strips extending in one direction. In practice, each track of the band regions TG1 and TG2 is a concentric circle that is curved along a shape of the disk 10. That is, an end in the leftward direction and an end in the rightward direction of each track of the band regions TG1 and TG2 are coincident in practice. In addition, the tracks are misaligned by being affected by a disturbance or other structures in the example illustrated in FIG. 2. Incidentally, the SMR region 10a may include more than two band regions, or may include fewer band regions than two band regions.

The band region TG1 and the band region TG2 are arranged in the radial direction with a gap (or may be referred to as a guard region) GP therebetween. Hereinafter, s configuration of a band region will be described using the band region TG1, but s configuration of the band region TG2 is also the same as the configuration of the band region TG1. Therefore, a detailed description of the configuration of the band region TG2 will be omitted.

In the example illustrated in FIG. 2, the band region TG1 includes write tracks WT11, WT12, WT13, WT14, and WT15. The write tracks WT11 and WT12 partially overlap with each other. The write tracks WT12 and WT13 partially overlap with each other. The write tracks WT13 and WT14 partially overlap with each other. The write tracks WT14 and WT15 partially overlap with each other. In the band region TG1, the write tracks WT11 to WT15 are overwritten in the radial direction in this order. Although not illustrated, the write tracks WT11, WT12, WT13, WT14, and WT15 each include a plurality of servo sectors and a plurality of data sectors. Incidentally, the band region TG1 includes five tracks, but may contain fewer tracks than five tracks or may include more tracks than five tracks.

The write track WT11 has a track edge E11A and a track edge E11B. In the example illustrated in FIG. 2, the track edge E11A is an end portion of the write track WT11 in the outward direction, and the track edge E11B is an end portion of the write track WT11 in the inward direction (forward direction). The write track WT12 has a track edge E12A and a track edge E12B. In the example illustrated in FIG. 2, the track edge E12A is an end portion of the write track WT12 in the outward direction, and the track edge E12B is an end portion of the write track WT12 in the inward direction (forward direction). The write track WT13 has a track edge E13A and a track edge E13B. In the example illustrated in FIG. 2, the track edge E13A is an end portion of the write track WT13 in the outward direction, and the track edge E13B is an end portion of the write track WT13 in the inward direction (forward direction). The write track WT14 has a track edge E14A and a track edge E14B. In the example illustrated in FIG. 2, the track edge E14A is an end portion of the write track WT14 in the outward direction, and the track edge E14B is an end portion of the write track WT14 in the inward direction (forward direction). The write track (final track) WT15 has a track edge E15A and a track edge E15B. In the example illustrated in FIG. 2, the track edge E15A is an end portion of the write track WT15 in the outward direction, and the track edge E15B is an end portion of the write track WT15 in the inward direction (forward direction).

A write track width WW11 of the write track WT11 is a length in the radial direction between the track edges E11A and E11B. A write track width WW12 of the write track WT12 is a length in the radial direction between the track edges E12A and E12B. The write track width WW13 of the write track WT13 is a length in the radial direction between the track edges E13A and E13B. The write track width WW14 of the write track WT14 is a length in the radial direction between the track edges E14A and E14B. The write track width WW15 of the write track WT15 is a length in the radial direction between the track edges E15A and E15B. The write track widths WW11 to WW15 are, for example, equivalent to each other. Incidentally, the write track widths WW11 to WW15 may be different from each other.

The read track RT11 is the remaining region except for a part of the write track WT11 overwritten with the write track WT12. The read track RT12 is the remaining region except for a part of the write track WT12 overwritten with the write track WT13. The read track RT13 is the remaining region except for a part, of the write track WT13 overwritten with the write track WT14. The read track RT14 is the remaining region except for a part of the write track WT14 overwritten with the write track WT15. The read track RT15 corresponds to the write track WT15. The read track RT15 corresponds to the last track in the band region TG1.

The read track width RW11 of the read track RT11 is a length in the radial direction between the track edges E11A and E12A. The read track width RW12 of the read track RT12 is a length in the radial direction between the track edges E12A and E13A. The read track width RW13 of the read track RT13 is a length in the radial direction between the track edges E13A and E14A. The read track width RW14 of the read track RT14 is a length in the radial direction between the track edges E14A and E15SA. The read track width RW15 of the read track RT15 is a length in the radial direction between the track edges E15A and E15B. That is, the read track width RW15 is equivalent to the write track width WW15.

In the example illustrated in FIG. 2, the band region TG2 includes write tracks WT21, WT22, WT23, WT24, and WT25. In the band region TG2, the write tracks WT21 to WT25 are overwritten in the radial direction in this order. The write tracks WT21 to WT25 correspond to the write tracks WT11 to WT15, respectively.

The write track width WW21 of the write track WT21 is a length in the radial direction between the track edges E21A and E21B. The write track width WW22 of the write track WT22 is a length in the radial direction between the track edges E22A and E22B. The write track width WW23 of the write track WT23 is a length in the radial direction between the track edges E23A and E23B. The write track width WW24 of the write track WT24 is a length in the radial direction between the track edges E24A and E24B. The write track width WW25 of the write track WT25 is a length in the radial direction between the track edges E25A and E25B.

The read track RT21 is the remaining region except for a part of the write track WT21 overwritten with the write track WT22. The read track RT22 is the remaining region except for a part of the write track WT22 overwritten with the write track WT23. The read track RT23 is the remaining region except for a part of the write track WT23 overwritten with the write track WT24. The read track RT24 is the remaining region except for a part of the write track WT24 overwritten with the write track WT25. The read track RT25 corresponds to the write track WT25. The read tracks RT21 to RT25 correspond to the read tracks RT11 to RT15, respectively.

The read track width RW21 of the read track RT21 is a length in the radial direction between the track edges E11A and E12A. The read track width RW22 of the read track RT22 is a length in the radial direction between the track edges E22A and E23A. The read track width RW23 of the read track RT23 is a length in the radial direction between the track edges E23A and E24A. The read track width RW24 of the read track RT24 is a length in the radial direction between the track edges E24A and E25A. The read track width RW25 of the read track RT25 is a length in the radial direction between the track edges E25A and E25B.

The head 15 includes a write head 15W and a read head 15R mounted on a slider serving as the main body. The write head 15W writes data on the disk 10. The read head 15R reads the data recorded on the disk 10. Incidentally, the write head 15W may be simply referred to as the head 15, the read head 15R may be simply referred to as the head 15, or the write head 15W and the read head 15R may be collectively referred to as a head 15 in some cases.

The driver IC 20 controls the drive of the SPM 12 and the VCM 14 according to control of the system controller 130 (specifically, an MPU 60 to be described later).

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 40 to be described later). The write driver-outputs a write current corresponding to a signal output from the R/W channel 40 to the head 15.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like to be transmitted and received between the magnetic disk device 1 and the host 100. Incidentally, the buffer memory 80 may be formed integrally with the volatile memory 70. The buffer memory 80 is, for example, a DRAM, a static random access memory (SRAM), an SDRAM, a ferroelectric random access memory (FeRAM), a magnetoresistive random access memory (MRAM), or the like.

The nonvolatile memory 90 is a semiconductor memory that records stored data even when power supply is cut off. The nonvolatile memory 90 is, for example, a NOR type or a NAND type flash read only memory (FROM).

The system controller (controller) 130 is realized using a large-scale integrated circuit (LSI) called a System-on-a-Chip (SoC) in which a plurality of elements is integrated on a single chip, for example. The system controller 130 includes the read/write (R/W) channel 40, a hard disk controller (HDC) 50, the microprocessor (MPU) 60, and the like. The system controller 130 is electrically connected to, for example, the driver IC 20, the head amplifier IC 30, the volatile memory 70, the buffer memory 80, the nonvolatile memory 90, the host system 100, and the like.

The R/W channel 40 executes signal processing of read data transferred from the disk 10 to the host 100 and write data transferred from the host 100 in response to an instruction from the MPU 60 to be described later. The R/W channel 40 has a circuit or a function to measure signal quality of the read data. The R/W channel 40 is electrically connected to the head amplifier IC 30, the HDC 50, the MPU 60, and the like, for example.

The HDC 50 controls data transfer between the host 100 and the R/W channel 40 in response to an instruction from the MPU 60 to be described later. The HDC 50 is electrically connected to, for example, the R/W channel 40, the MPU 60, the volatile memory 70, the buffer memory 30, the nonvolatile memory 90, and the like.

The MPU 60 is a main controller that controls each unit of the magnetic disk device 1. The MPU 60 controls the VCM 14 via the driver IC 20 and executes servo control for positioning the head 15. The MPU 60 controls a write operation of data to the disk 10 and selects a storage destination of the write data. In addition, the MPU 60 controls a read operation of data from the disk 10 and controls processing of the read data. The MPU 60 is connected to each unit of the magnetic disk device 1. The MPU 60 is electrically connected to the driver IC 20, the R/W channel 40, the HDC 50, and the like, for example.

The MPU 60 includes a read/write controller 61. The MPU 60 executes processing of each unit, for example, the read/write controller 61 and the like, on firmware. Incidentally, the MPU 60 may include each unit as a circuit.

The read/write controller 61 controls data read processing and write processing according to a command from the host 100. The read/write controller 61 controls the VCM 14 via the driver IC 20 to position the head 15 at a particular position on the disk 10 and read or write data. For example, in the case of executing SMR, the read/write controller 61 sequentially writes data in a particular band region. For example, in the case of reading the particular band region, the read/write controller 61 sequentially reads data. The read/write controller 61 includes a seek controller 611 and a positioning controller 612. Hereinafter, "positioning or arranging a central portion of the head 15 (the write head 15W or the read head 15R) at a particular position" may be simply expressed as "positioning or arranging the head 15 (the write head 15W or the read head 15R) at a particular position" in some cases.

The seek controller 611 seeks the head 15 at a particular position on the disk 10, for example, a particular position in the radial direction (hereinafter, referred to as a radial position) of a particular position in the circumferential direction (hereinafter referred to as a circumferential position). In one example, the seek controller 611 seeks the head 15 to a particular sector of a particular track on the disk 10.

The positioning controller 612 controls the positioning of the head 15 to a target radial position (hereinafter referred to as a target position) during the read processing and the write processing in each track. The positioning controller 612 executes the positioning control of the head 15 by sampling interrupt control in units of servo sectors. For example, the positioning controller 612 controls the head 15 so as to follow a path serving as a target (hereinafter referred to as a target path) during the read processing and the write processing in each track. Here, a path of the head 15 corresponds to, for example, the radial position of the head 15 at each circumferential position of a particular track.

Hereinafter, a radial position of the head 15, for example, the write head 15W or the read head 15R, during the write processing is referred to as a write position, and a radial position of the head 15, for example, a read head 15R during the read processing is referred to as a read position. A path of the head 15 during the write processing is referred to as a write path, and a path of the head 15 during the read processing is referred to as a read path. A target, position of the head 15 during the write processing is referred to as a target write position and a target position of the head 15 during the read processing is referred to as a target read position. In addition, a target path of the head 15 during the write processing is referred to as a target write path, and a target path of the head 15 during the read processing is referred to as a target read path.

In one example, the positioning controller 612 positions the head 15, for example, the write head 15W to a target write position (hereinafter referred to as an initial write position) corresponding to a radial position of a central portion of the write track (hereinafter referred to as an initial write track) written concentrically to the disk 10 during the write processing. In other words, the positioning controller 612 controls the head 15, for example, the write head 15W so as to follow a target write path (hereinafter referred to as an initial write path) passing through the central portion in the radial direction of the initial write track during the write processing.

In addition, the positioning controller 612 positions the head 15, for example, the read head 15R at a normal target read position (hereinafter referred to as an initial read position) corresponding to a radial position of a central portion of a remaining read track (hereinafter referred to as an initial read track) of the write track that has been written to the initial write position (initial write path) except for a part where the write track adjacent in the forward direction has been overwritten, the write track written to the initial write position (initial write path), for example, during the read processing. In other words, the positioning controller 612 controls the head 15, for example, the read head 15R so as to follow a target read path (hereinafter referred to as an initial read path) passing through the central portion in the radial direction of the initial read track during the read processing.

The positioning controller 612 acquires information (hereinafter simply referred to as position information) related to the position of the head 15, for example, the write head 15W (or the read head 15R) during the write processing. Hereinafter, the position information of the head 15 during the write processing is referred to as write position information. The write position information includes information related to the radial position of the head 15 at each circumferential position during the write processing, that is, information related to a path of the head 15 during the write processing (hereinafter referred to as write path information), a difference value (hereinafter also referred to as an offset value in some cases) between an initial write position at each circumferential position and a current (or actual) write position (hereinafter referred to as an actual write position), a difference value (hereinafter also referred to as a write error) between the target write position and the actual write position at each circumferential position, and the like. Hereinafter, a difference value between the target read position and a current read position (hereinafter referred to as an actual read position) may be referred to as a read error. The positioning controller 612 records the acquired write position information in a memory, for example, the disk 10, the volatile memory 70, the buffer memory 80, the nonvolatile memory 90, or the like.

When acquiring a plurality of pieces of write position information (hereinafter referred to as band information) corresponding to a plurality of tracks, respectively, in a particular band region, the positioning controller 612 writes the acquired band information in a particular region of the band region corresponding to the band information. For example, the positioning controller 612 writes band information corresponding to a particular band region in a track to be read first during the read processing (hereinafter referred to as a start track) in the band region. Data to be written to a particular band region sent from the host 100, the data to be read first during the read processing, for example, data (hereinafter referred to as "foremost data") corresponding to a logical address the smallest number within the logical address of the data to be written to the particular band region sent from the host 100 is written to the start track. In one example, the positioning controller 612 writes band information corresponding to a particular band region in a region to be read first during the read processing, that is, a region where the read processing is started (hereinafter referred to as a start region) in the start track of the band region. The start region includes at least one sector. The start region is positioned in a direction opposite to the progressing direction of a region where the foremost data has been written. The foremost data may be written in the start region. In one example, the positioning controller 612 writes band information corresponding to a particular band region in a sector to be read first during the read processing (hereinafter referred to as a start sector) in the start region of the band region. The start sector is positioned in the opposite direction to the progressing direction of a sector in which the foremost data has been written, for example, an immediately previous position in the direction opposite to the progressing direction.

When the band information is written to the start track of the band region corresponding to this band information, the positioning controller 612 may set a threshold (hereinafter referred to as a write inhibition threshold) of a shift amount that allows deviation in the radial direction of the head 15 with respect to an initial write position where a write operation in the forward direction is inhibited to be smaller than a write inhibition threshold in the direction opposite to the forward direction. As the write inhibition threshold is set in this manner, overwriting of the band information on data that has been written in a region adjacent in the forward direction of a particular region of the start track in which the band information has been written is suppressed.

The positioning controller 612 can execute the positioning control based on the position information. Hereinafter, controlling the head 15 so as to follow a current target position and a current target path generated based on the position information may be referred to as an adaptive track center or automatic track width control (ATC) control. For example, based on write position information (hereinafter referred to as previous write position information) corresponding to a write track (hereinafter referred to as a previous write track or a previous track) that has been written immediately before a write track that is being currently written (hereinafter referred to as a current write track or a current track), the positioning controller 612 generates a target write position (hereinafter referred to as a current target write position) and a target write path (hereinafter referred to as a current target write path) in the current write track, and controls the write head 15W based on the generated current target write position and the current target write path. Hereinafter, to control the head 15, for example, the write head 15W based on the current target write position and the current target write path generated based on the previous write position information may be referred to as write ATC control in some cases. In addition, based on band information, for example, write position information (hereinafter referred to as next write position information) corresponding to a read track (hereinafter referred to as a next read track) positioned (adjacent) immediately before a read track that is being currently read (hereinafter referred to as a current read track or a current track) in the forward direction or a write track (hereinafter referred to as a next write track) and write position information (hereinafter referred to as current write position information) corresponding to the current read track (current write track), the positioning controller 612 generates a target read position (hereinafter referred to as a current target read position) and a target read path (hereinafter referred to as a current target read path) in the current read track and controls the read head 15R based on the generated current target read position and current target read path. Hereinafter, to control the head 15, for example, the read head 15R based on the band information, for example, the current target read position and the current target read path generated based on the next write position information and the current write position information is referred to as read ATC control. Hereinafter, a sector that is being currently written or read is referred to as a current data sector, and a data sector positioned in the progressing direction of the current sector, for example, the sector positioned immediately before the current sector is referred to as a next sector.

FIG. 3 is a schematic diagram illustrating an example of write processing according to the first embodiment. The example illustrated in FIG. 3 illustrates the write head 15W, a central portion WC of the write head 15W, and a write track WTn in a band region TGn. In the example illustrated in FIG. 3, the write head 15W writes data to a data sector SC (n, k) of the write track WTn in the band region TGn. FIG. 3 illustrates an initial write position WTCn of the write track WTn, an initial write position $X1w$ (n, k) in the data sector SC (n, k) corresponding to the initial write position WTCn, an actual write position Yw (n, k) in the data sector SC (n, k), and a correction value (hereinafter referred to as a write correction value) $X2w$ (n, k) for the initial write position $X1w$ (n, k) in the data sector SC (n, k). The write correction value is calculated, for example, based on an actual write position of a data sector adjacent in the direction opposite to the forward direction of a particular data sector in a particular band region. In the example illustrated in FIG. 3, the initial write position WTCn corresponds to a target write position TWP (n, k) in the data sector SC (n, k). The initial write position $X1w$ (n, k) corresponds to a target write position Xw (n, k) associated with the target write position TWP (n, k) in the data sector SC (n, k). In addition, the write correction value $X2w$ (n, k) corresponds to a write error ew (n, k) which is a difference value between the target write position Xw (n, k) and the actual write position Yw (n, k) and an offset value $X3w$ (n, k) which is a difference value between the initial write position $X1w$ (n, k) and the actual write position Yw (n, k). The initial write position $X1w$ (n, k) corresponds to, for example, a distance in the radial direction from a reference radial position (hereinafter referred to as a reference position) to the initial write position WTCn (the target write position TWP (n, k)), and the actual write position Yw (n, k) corresponds to, for example, a distance in the radial direction from the reference position to the central portion WC of the current write head 15W in the data sector SC (n, k).

For example, when servo sampling interruption starts in the example illustrated in FIG. 3, the positioning controller 612 acquires the initial write position X1w (n, k) (target write position Xw (n, k)) in the data sector SC (n, k). The positioning controller 612 acquires the actual write position Yw (n, k). The positioning controller 612 acquires the offset value X3w (n, k) based on the initial write position X1w (n, k) and the actual write position Yw (n, k). The positioning controller 612 records the write position information including the offset value X3w (n, k) associated with the track WTn, the data sector SC (n, k), the head 15, and the like as a table in a memory, for example, the volatile memory 70, the buffer memory 80, the nonvolatile memory 90, or the like. The positioning controller 612 calculates the write error ew (n, k) based on the target write position Xw (n, k) and the actual write position Yw (n, k) and controls the write head 15W so as to be positioned at the target write position Xw (n, k) based on the write error ew (n, k).

The positioning controller 612 acquires an initial write position and an actual write position in each track of the band region TGn and acquires an offset value based on the initial write position and the actual write position. The positioning controller 612 records the write position information including the offset value in each track of the band region TGn as a table in a memory, for example, the volatile memory 70, the buffer memory 80, the nonvolatile memory 90, or the like. The positioning controller 612 writes a plurality of pieces of the write position information corresponding to the plurality of tracks, respectively, of the band region TGn recorded in the memory to the band region TGn, for example, the start sector of the band region TGn as the band information.

Figure 4:
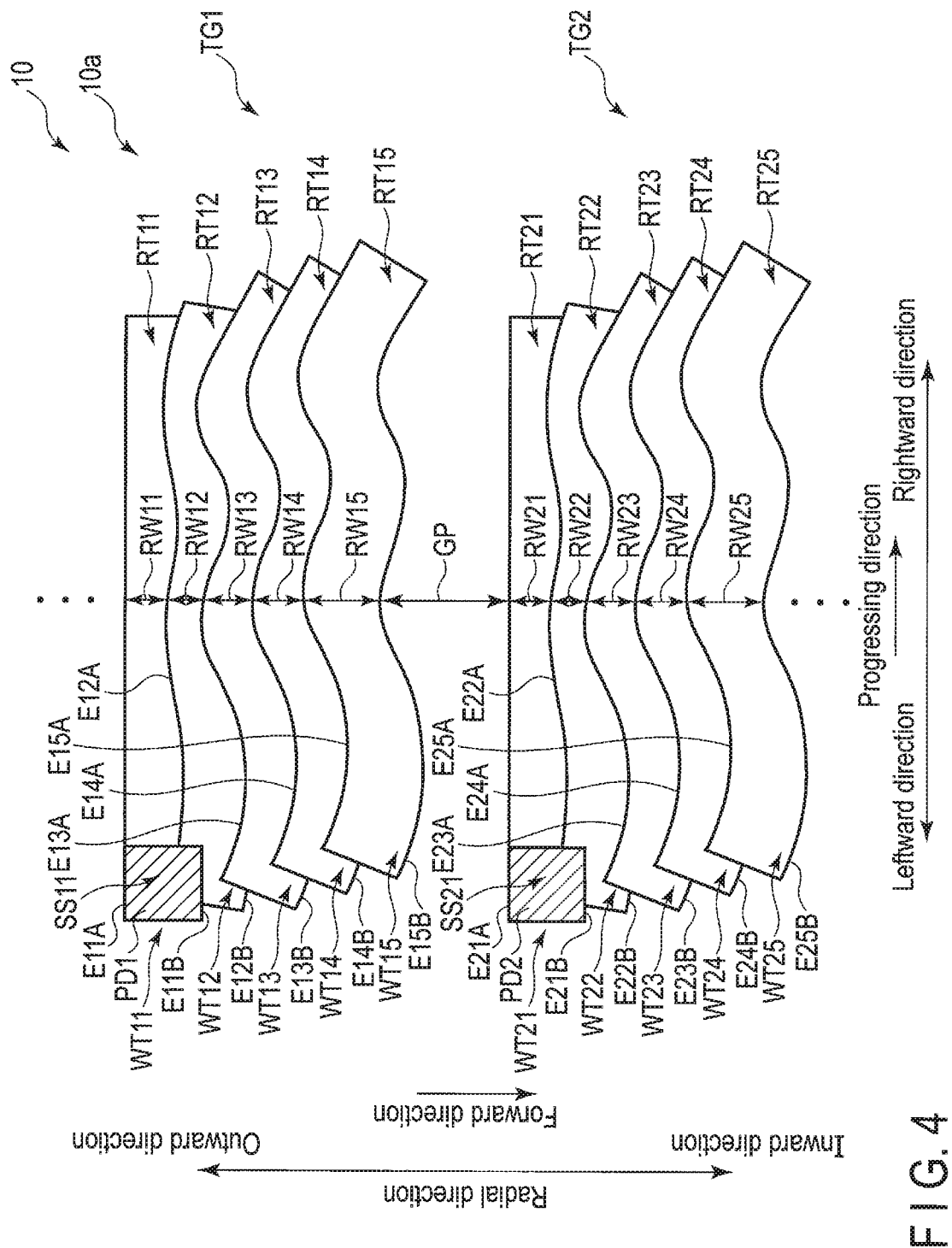
FIG. 4 is a diagram illustrating an example of a position where band information is written in a band region according to the first embodiment.

FIG. 4 is a diagram illustrating an example of a position where band information is written in a band region according to the first embodiment.

For example, the positioning controller 612 acquires write position information in each data sector of the write track WT11 along the progressing direction during the write processing of the write track WT11 of the band region TG1. The positioning controller 612 acquires write position information in each data sector of each track from the write track WT12 to the write track (last track) WT15 in the same manner as in the write track WT11. After acquiring the write position information of the write track WT15, the positioning controller 612 writes band information PD1 including the write position information of the write tracks WT11 to WT15 to a start sector SS11 of the write track WT11 that has been first written in the band region TG1.

In addition, the positioning controller 612 acquires write position information in each data sector of the write track WT21 along the progressing direction during the write processing of the write track WT21 of the band region TG2, for example. The positioning controller 612 acquires write position information in each data sector of each track from the write track WT21 to the write track (last track) WT25 in the same manner as in the write track WT21. After acquiring the write position information of the write track (last track) WT25, the positioning controller 612 writes band information PD2 including the write position information of the write tracks WT21 to WT25 to a start sector SS21 of the write track WT11 that has been first written in the band region TG2.

Figure 5:
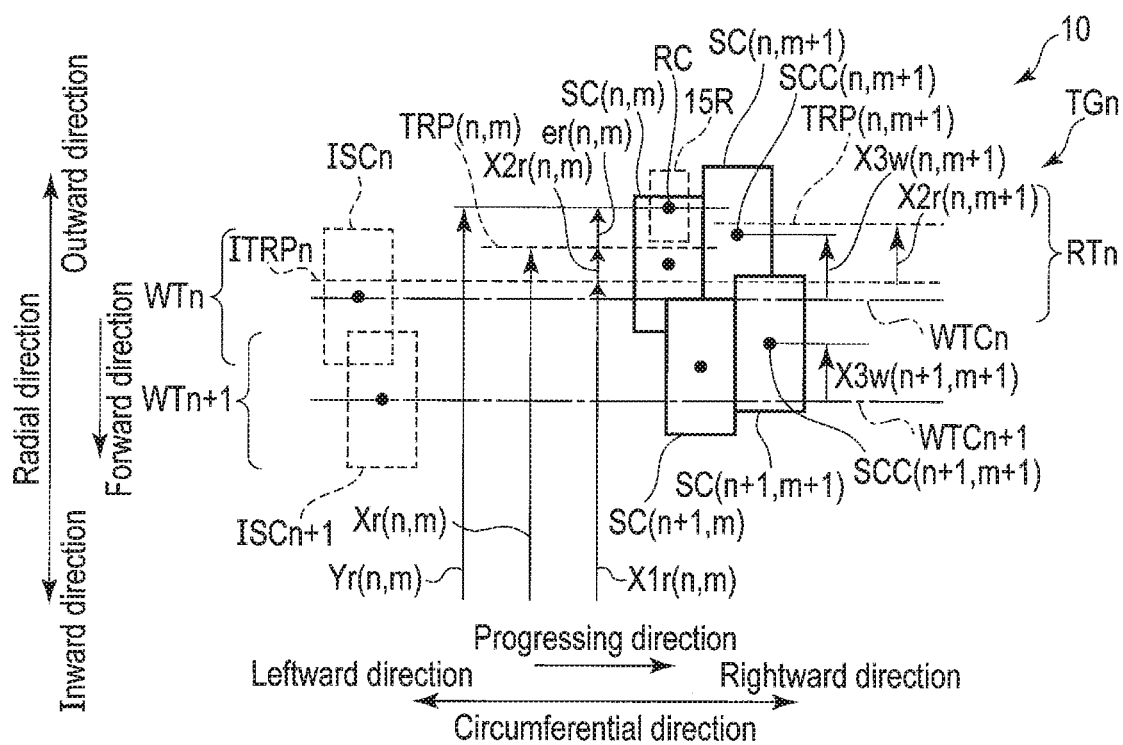
FIG. 5 is a schematic diagram illustrating an example of read ATC control.

FIG. 5 is a schematic diagram illustrating an example of read ATC control. The example illustrated in FIG. 5 illustrates the read head 15R, a central portion RC of the read head 15R, the write track WTn in the band region TGn, a write track WTn+1 overwritten on a part of the write track WTn in the forward direction, a read track RTn corresponding to the remaining write track WTn except for a part overwritten with the write track Tn+1, a data sector SC (n, m) of the write track WTn and the read track RTn, a next sector SC (n, m+1) of the write track WTn and the read track RTn positioned (or adjacent) in the progressing direction of the data sector SC (n, m), a data sector SC (n+1, m) of the write track WTn+1, and a next sector SC (n+1, m+1) of the write track WTn+1 positioned (or adjacent) in the progressing direction of the data sector SC (n+1, m). The data sector SC (n+1, m) is adjacent to the data sector SC (n, m) in the forward direction, and the data sector SC (n+1, m+1) is adjacent to the data sector SC (n, m+1) in the forward direction. In addition, FIG. 5 illustrates (data of) a data sector ISCn written by positioning the write head 15W at the initial write position WTCn of the write track WTn, (data of) a data sector ISCn+1 written by positioning the write head 15W at the initial write position WTCn+1 of the write track WTn+1, and an initial read position ITRPn of the data sector ISCn of the read track RTn. The initial read position ITRPn corresponds to a radial position of a middle portion of a width in the radial direction of (data of) the remaining data sector ISCn except for a part where (data of) the data sector ISCn+1 has been overwritten.

In the example illustrated in FIG. 5, the read head 15R reads data of the data sector SC (n, m) of the read track RTn based on the next write position information and the current write position information in the band region TGn. FIG. 5 illustrates an initial read position X1r corresponding to the initial read position ITRPn, a correction value (hereinafter referred to as a read correction value) X2r (n, m) for the initial read position X1r (n, m) (read position ITRPn) of the data sector SC (n, m), a target, read position TRP (n, m) of the data sector SC (n, m), a target read position Xr (n, m) of the data sector SC (n, m) corresponding to the target read position TRP (n, m), an actual read position Yr (n, m) of the data sector SC (n, m), a read error er (n, m) which is a difference value between the target read position Xr (n, m) and the actual read position Yr (n, m), an offset value X3w (n, m+1) which is a difference value between the initial write position WTCn of the write track WTn and a radial position of a central portion SCC (n, m+1) of (data of) the data sector SC (n, m+1), an offset value X3w (n+1, m+1) which is a difference value between the initial write position WTCn+1 of the write track WTn+1 and a radial position of a central portion SCC (n+1, m+1) of (data of) the data sector SC (n+1, m+1), a target read position TRP (n, m+1) of the data sector SC (n, m+1), and a read correction value X2r (n, m+1) of the initial read position ITRPn of the data sector SC (n, m+1). The read correction value is calculated, for example, based on an actual write position of a data sector adjacent in the forward direction of a particular data in a particular band region. For example, the target read position TRP (n, m) corresponds to a radial position of a middle portion of a width in the radial direction of (data of) the remaining sector SC (n, m) except for a part where (data of) the data sector SC (n+1, m) has been overwritten. For example, the target read position TRP (n, m+1) corresponds to a radial position of a middle portion of a width in the radial direction of (data of) the remaining sector SC (n, m+1) except for a part where (data of) the data sector SC (n+1, m+1) has been overwritten. In the example illustrated in FIG. 5, the initial read position X1r (n, m) corresponds to, for example, a distance in the radial direction from the reference position to the initial read position ITRPn, the target read position Xr (n, m)

corresponds to a distance in the radial direction from the reference position to the target read position TRP (n, m), and the actual read position Yr (n, m) corresponds to, for example, a distance in the radial direction from the reference position to the central portion RC of the current read head 15R of the data sector SC (n, m).

In the example illustrated in FIG. 5, the positioning controller 612 acquires the initial read position X1r (n, m) of the data sector SC (n, m), for example, when the servo sampling interruption starts. If a flag indicating the execution of the read ATC control, for example, a bit indicating the execution of the read ATC control has been asserted, the positioning controller 612 determines that the read ATC control is being executed. When determining that the read ATC control is being executed, the positioning controller 612 acquires the read correction value X2r (n, m) corresponding to the data sector SC (n, m) from the band information of the table, and acquires the target read position Xr (n, m) by adding the read correction value X2r (n, m) to the initial read position X1r (n, m). For example, when determining that the read ATC control is being executed, the positioning controller 612 acquires the actual read position Yr (n, m) on the current read track within the band information. The positioning controller 612 calculates the read error er (n, m) based on the target read position Xr (n, m) and the actual read position Yr (n, m), and controls the read head 15R so as to be positioned at the target read position Xr (n, m) based on the read error er (n, m).

For the next servo sampling interruption, the positioning controller 612 acquires the offset value X3w (n, m+1) of (data of) the next data sector SC (n, m+1) positioned in the progressing direction of the data sector SC (n, m) from the table including the band information, and the offset value X3w (n+1, m+1) of (data of) the data sector SC (n+1, m+1) adjacent in the forward direction of the data sector SC (n, m+1). The positioning controller 612 calculates the read correction value X2r (n, m+1) corresponding to the data sector SC (n, m+1) based on the offset values X3w (n, m+1) and X3w (n+1, m+1), and records the read correction value X2r (n, m) in a memory, for example, the volatile memory 70, the buffer memory 80, the nonvolatile memory 90, or the like.

Figure 6:
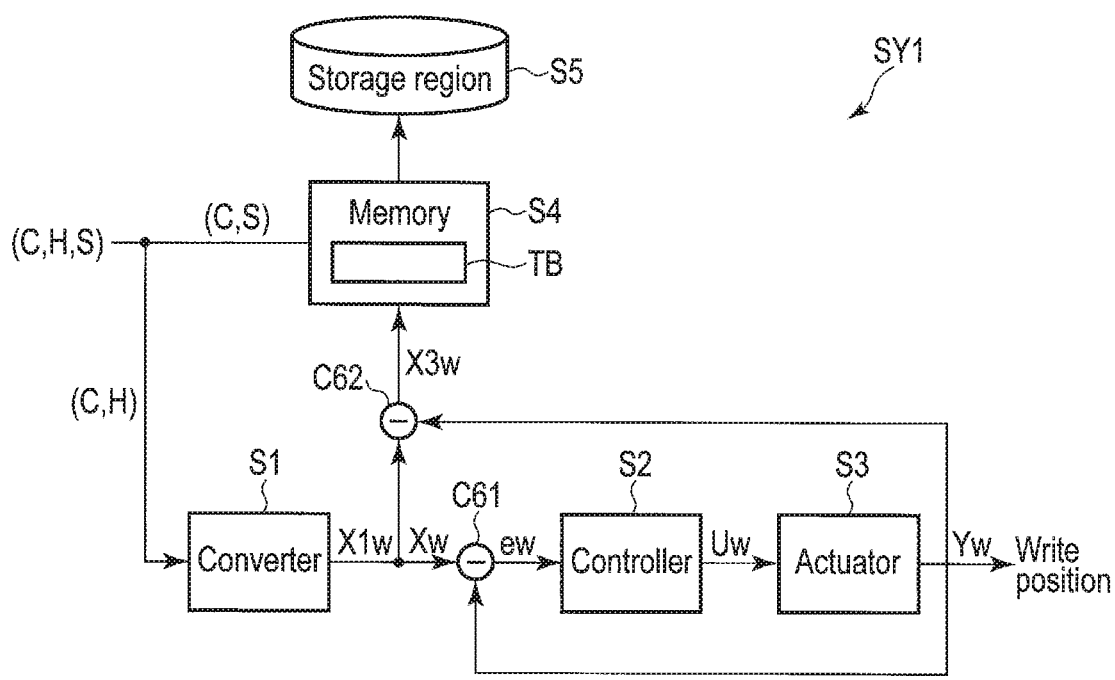
FIG. 6 is a block diagram illustrating an example of a head positioning control system during write processing according to the first embodiment.

FIG. 6 is a block diagram illustrating an example of the positioning control system SY1 of the head 15 during the write processing according to the first embodiment.

The magnetic disk device 1 includes the positioning control system (hereinafter referred to as a write control system) SY1 for the head 15 during the write processing. The write control system SY1 includes a converter S1, a controller S2, an actuator S3, a memory SA, a storage region S5, and calculation units C61 and C62. The converter S1, the controller S2, the calculation unit C61, and the calculation unit C62 are included in the system controller 130, for example. The actuator S3 is included in the actuator AC, for example. The memory S4 is included in, for example, the volatile memory 70, the buffer memory 80, or the nonvolatile memory 90. The storage region S5 is included in the disk 10, for example.

The converter S1 converts a logical position (hereinafter referred to as a logical position) of the disk 10 designated by a host device, for example, the host 100, to a physical position (hereinafter referred to as a "physical position") of the disk 10. The logical location may be, for example, a logical address, and the physical location may be, for example, a physical address.

The controller S2 controls the actuator S3. The controller S2 generates the drive amount (hereinafter referred to as the write drive amount) Uw of the head 15 during the write processing of the actuator S3, for example, based on the write error ew. Incidentally, the controller S2 may generate the write drive amount Uw based on a value other than the write error ew.

The actuator S3 is driven in accordance with an output of the controller S2. The actuator S3 is driven, for example, based on the write drive amount Uw, and moves the head 15 to the actual write position Yw.

The memory S4 has a table TB. The table TB includes the write position information and the band information.

When a logical position for writing data, for example, a position (C: a track or a cylinder, H: a head, S: a sector) is designated in a particular band, the position (C, H) is input to the converter S1. The converter S1 converts the position (C, H) to the initial write position X1w (target write position Xw) which is a physical position, and outputs the physical position to the calculation units C61 and C62. The calculation unit C61 outputs the write error ew, which is the difference value between the actual write position Yw and the initial write position X1w (target write position Xw), to the controller S2. The write error ew is input to the controller S2. The controller S2 outputs the write drive amount Uw to the actuator S3. The write drive amount Uw is input to the actuator S3. The actuator S3 is driven according to the write drive amount Uw and moves the head 15, for example, the write head 15W to the actual write position Yw corresponding to the write drive amount Uw. The actuator S3 outputs the actual write position Yw to the calculation units C61 and C62. The calculation unit C62 outputs an offset value X3w which is a difference value between the actual write position Yw and the initial write position X1w to the memory S4. The logical position (C, S) and the offset value X3w are input to the memory S4. In the memory S4, the write position information including the offset value X3w associated with the logical position (C, S) is recorded as a table. When the entire write position information in a particular band region has been recorded, the memory S4 writes the entire write position information of the particular band region in the storage region S5 as band information.

FIG. 7 is a block diagram illustrating an example of a positioning control system SY2 of the head 15 during read processing according to the first embodiment.

The magnetic disk device 1 includes the positioning control system (hereinafter referred to as a read control system) SY2 for the head 15 during the read processing. The read control system SY2 includes the converter S1, the controller S2, the actuator S3, the memory S4, the storage region S5, an amplifier A1, a delayer S6, and calculation units C71 and C72. The amplifier A1, the delayer 36, the calculation unit C71, and the calculation unit C72 are included, for example. in the system controller 130.

For example, the controller S2 generates a drive amount (hereinafter referred to as a read drive amount) Ur of the head 15 during the read processing of the actuator S3 based on the read error er. The controller S2 may generate the read drive amount Ur based on a value other than the read error er.

The actuator S3 is driven, for example, based on the read drive amount Ur, and moves the head 15 to the actual read position Yr.

The amplifier A1 performs multiplication by a particular value. For example, the amplifier A1 multiplies a value, obtained by adding an offset value X3w (C, S+1) of a data sector (C, S+1) next to the data sector (C, S) corresponding to the position (C, H, S) designated from the host device and an offset value X3w (C+1, S+1) of a data sector (C+1, S+1) adjacent in the forward direction of the next sector (C, S+1), by ½.

The delayer S6 performs delay by one sample period. For example, the delayer S6 delays a read correction value X2r (C, S+1) corresponding to the next sector (C, S+1) by one sampling period.

When the position (C, H, S) for reading data is designated in a particular band region, the position (C, H, S) is input, to the converter S1. The converter S1 converts the position (C, H) to the initial read position X1r which is a physical position, and outputs the physical position to the calculation unit C71. The calculation unit C71 generates the target read position Xr obtained by adding the read correction value X2r (C, S) to the initial read position X1r, and outputs the generated target read position Xr to the calculation unit C72. The target read position Xr and the actual read position Yr are input to the calculation unit C72. The calculation unit C72 outputs the read error er which is the difference value between the target read position Xr and the actual read position Yr to the controller S2. The read error er is input to the controller S2. The controller S2 outputs the read drive amount Ur to the actuator S3. The read drive amount Ur is input to the actuator S3. The actuator S3 is driven based on the read drive amount Ur and moves the head 15, for example, the read head 15R to the actual read position Yr corresponding to the read drive amount Ur. The actuator S3 outputs the actual read position Yr to the calculation unit C72. The position (C, S) is input to the memory S4 and a table including the band information of the particular band region as input from the storage region S5 to the memory S4. The memory S4 outputs the offset value X3w (C, S+1) corresponding to the data sector (C, S+1) next to the data sector (C, S) corresponding to the position (C, S) and the offset value X3w (C+1, S+1) corresponding to the data sector (C+1, S+1) adjacent in the forward direction of the data sector (C, S+1) to the amplifier A1. The offset values X3w (C, S+1) and X3w (C+1, S+1) are input to the amplifier A1. The amplifier A1 outputs the read correction value X2r (C, S+1) corresponding to the data sector (C, S+1), obtained by multiplying a value, obtained by adding the offset value X3w (C, S+1) and the offset value X3w (C+1, S+1), by ½ to the delayer S6. The delayer S6 outputs the correction value X2r (C, S) obtained by delaying the read correction value X2r (C, S+1) by one sampling period to the calculation unit C71.

FIG. 8 is a flowchart illustrating an example of a write processing method according to the first embodiment.

The system controller 130 receives a write command from the host 100 (B801). The system controller 130 moves the head 15 to a particular sector (data sector) in a designated particular band region (B802). For example, the system controller 130 moves the head 15 to a start sector of the designated particular band region or a next sector positioned in the progressing direction of the start sector. The system controller 130 writes data (B803). For example, the system controller starts data write processing in the progressing direction from the start sector or the next sector positioned in the progressing direction of the start sector, and writes the data sequentially in the forward direction. The system controller 130 acquires write position information during the write processing (B804). For example, the system controller 130 acquires a plurality of pieces of write position information (band information) corresponding to a plurality of tracks, respectively, in a particular band region. When acquiring the plurality of pieces of position information (band information) corresponding to the plurality of tracks, respectively, in the particular band region, the system controller 130 moves the head 15 to a particular sector (data sector) (B805). For example, when acquiring the band information in the particular band region, the system controller 130 moves the head 15 to the start sector of a write track that has been first written in the particular band region. The system controller 130 writes the band information in the particular sector (B806), and ends the processing. For example, the system controller 130 writes the band information in the start sector of the particular band region and ends the processing.

FIG. 9 is a flowchart illustrating an example of a read processing method according to the first embodiment.

The system controller 130 receives a read command from the host 100 (B901). The system controller 130 moves the head 15 to a particular sector (data sector) in a designated particular band region (B902). For example, the system controller 130 moves the head 15 to a start sector of the designated particular band region. The system controller 130 reads band information written in the particular sector (B903). For example, the system controller 130 reads the band information written in the start sector of the particular band region. The system controller 130 executes read ATC control (B904). For example, the system controller 130 asserts a flag, for example, a bit that indicates the execution of the read ATC control. The system controller 130 reads data by the read ATC control based on the band information (B905), and ends the processing. For example, the system controller 130 sequentially reads the data by the read ATC control in the forward direction from the start track of the particular band region to the last track based on write position information (current write position information) of a current read target sector and write position information (next write position information) of an adjacent track, and ends the processing.

Figure 10:
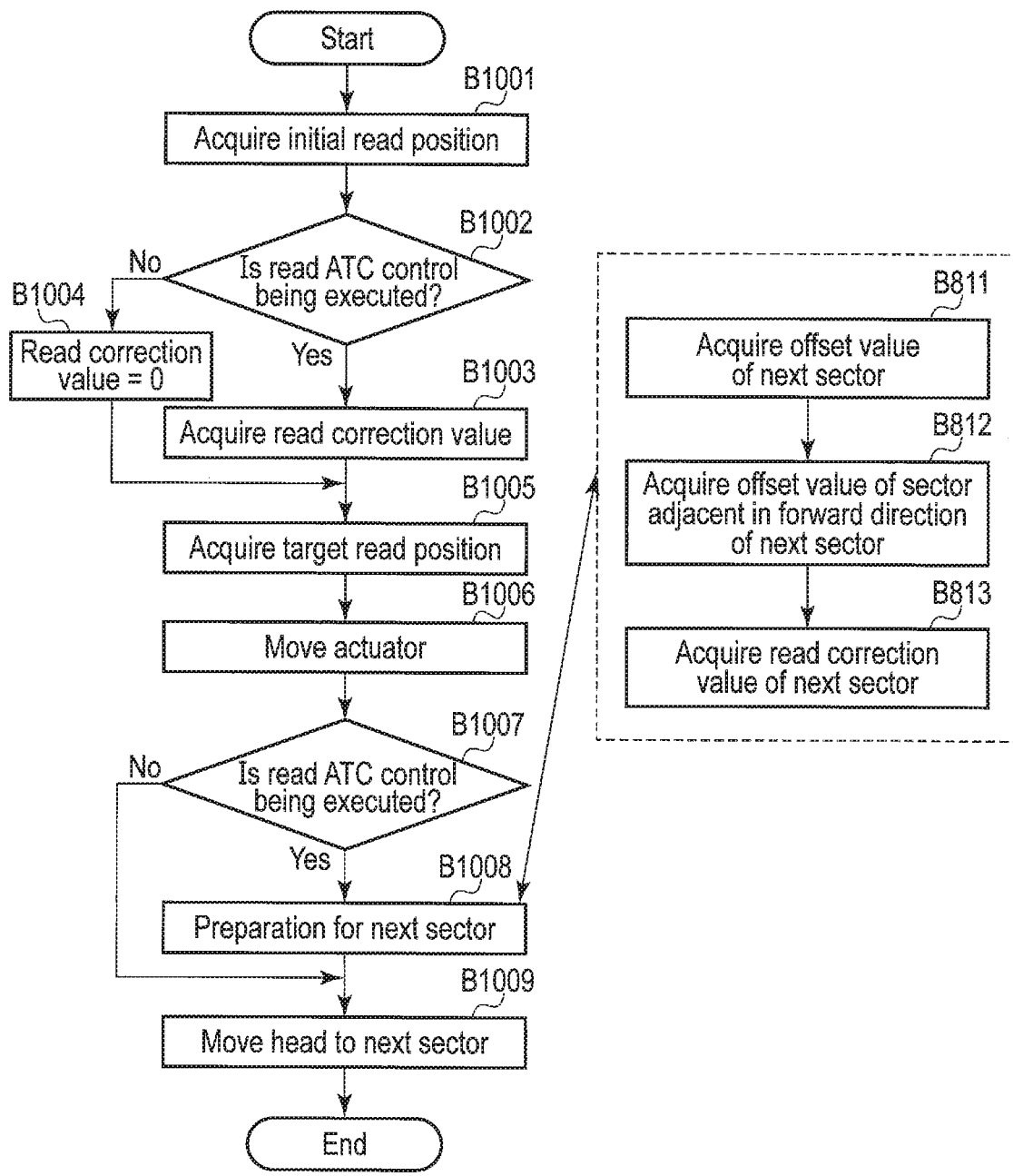
FIG. 10 is a flowchart illustrating an example of head positioning control during read processing.

FIG. 10 is a flowchart illustrating an example of positioning control of the head 15 during the read processing.

When the servo sampling interruption starts, the system controller 130 acquires an initial read position of the current sector (B1001). The system controller 130 determines whether the read ATC control is being executed (B1002). For example, the system controller 130 determines whether the bit indicating the execution of the read ATC control has been asserted or has not been asserted. When determining that the read ATC control is being executed (YES in B1002), the system controller 130 acquires a read correction value for the initial read position of the current sector (B1003). For example, when determining that the bit indicating the execution of the read ATC control has been asserted, the system controller 130 acquires the read correction value for the initial read position of the current sector from the table TB. When determining that the read ATC control is not being executed (NO in B1002), the system controller 130 sets the read correction value for the initial read position of the current sector to zero (B1004). For example, when determining that the bit indicating the execution of the read ATC control has been asserted, the system controller 130 sets the read correction value for the initial read position of the current sector to zero.

The system controller 130 acquires a target read position based on the initial read position and the read correction value (B1005). The system controller 130 drives the actuator AC based on the target read position and the actual read position (B1006). For example, the system controller 130 calculates the read error based on the target read position and the actual read position, and drives the actuator AC such that the head 15 is positioned at the target read position based on the read error.

The system controller 130 determines whether the read ATC control is being executed (B1007). When determining that the read ATC control is being executed (YES in B1007), the system controller 130 executes preparation for the next sector positioned in the progressing direction of the current sector (B1008). In preparation for the next sector (B1008), the system controller 130 acquires an offset value of the next sector (B811) and acquires an offset value of the sector adjacent in the forward direction of the next sector (B812). The system controller 130 acquires the read correction value corresponding to the next sector based on the offset value of the next sector and the offset value of the sector adjacent in the forward direction of the next sector (B813), and ends the preparation for the next sector (B1008). For example, the system controller 130 acquires an average value of the offset value of the next sector and the offset value of the sector adjacent in the forward direction of the next sector as the read correction value corresponding to the next sector, and records the read correction value corresponding to the next sector in a memory, for example, the volatile memory 70, the buffer memory 80, or the nonvolatile memory 90. When determining that the read ATC control is not being executed (NO in B1007), the system controller 130 moves the head 15 to the next sector (B1009), and ends the processing.

According to the present embodiment, the magnetic disk device 1 acquires the write position information in each track of a particular band region when sequentially writing data in the particular band region. When band information of the particular band region is acquired, the magnetic disk device 1 writes the band information to a start sector of the particular band region. When reading the particular band region, the magnetic disk device 1 reads the band information of the start sector, and sequentially reads each track of the particular band region by the read ATC control based on the band information. The magnetic disk device 1 can accurately read a current read track at each circumferential position based on current write position information and next write position information. Therefore, the magnetic disk device 1 can improve read processing performance.

Next, magnetic disk devices according to other embodiments and modifications will be described. In the other embodiments and modifications, the same parts as those in the above-described embodiment will be denoted by the same reference signs, and a detailed description thereof will be omitted.

Second Embodiment

A magnetic disk device 1 of a second embodiment is different from that of the first embodiment in that write ATC control is executed.

Figure 11:
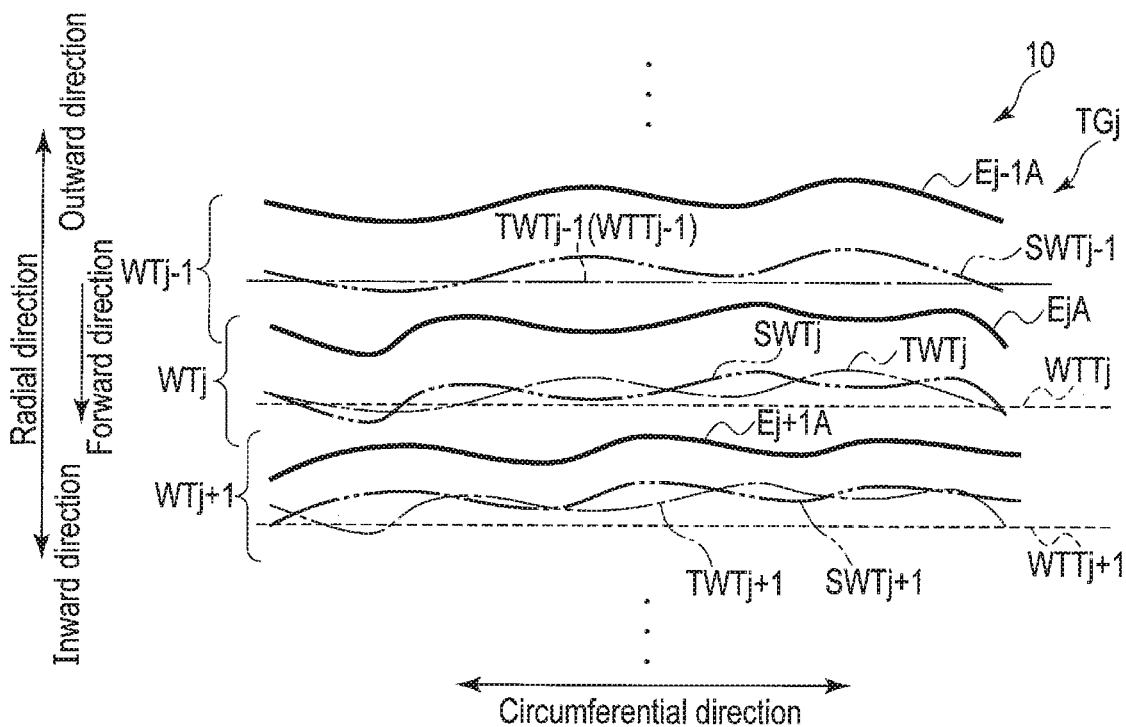
FIG. 11 is a schematic diagram illustrating an example of write ATC control.

FIG. 11 is a schematic diagram illustrating an example of the write ATC control.

In the example illustrated in FIG. 11, a band region TGj includes write tracks WTj−1, WTj, and WTj+1. In the band region TGj, the write tracks WTj−1 to WTj+1 are overwritten in this order in the forward direction. The write track WTj−1 has a track edge Ej−1A. In the example illustrated in FIG. 11, the track edge Ej−1A is an end portion of the write track WTj−1 in the outward direction. FIG. 11 illustrates an initial write path WTTj−1 corresponding to the write track WTj−1. The write track WTj has a track edge EjA. In the example illustrated in FIG. 11, the track edge EjA is an end portion of the write track WTj in the outward direction. FIG. 11 illustrates an initial write path WTTj corresponding to the write track WTj. The write track WTj+1 has a track edge Ej+1A. In the example illustrated in FIG. 11, the track edge Ej+1A is an end portion of the write track WTj+1 in the outward direction. FIG. 11 illustrates an initial write path WTTj+1 corresponding to the write track WTj+1.

A positioning controller 612 controls positioning of a write head 15W so as to follow a target write path TWTj−1 at the time of writing the write track WTj−1. The target write path TWTj−1 corresponds to the initial write path WTTj−1. In practice, the write head 15W runs on an actual write path (hereinafter referred to as an actual write path) SWTj−1 including a write error when writing the write track WTj−1. The positioning controller 612 acquires, for example, write path information of the head 2 5, for example, the write head 15W during the write processing corresponding to the actual write path SWTj−1, and records the acquired write path information in a memory, for example, a disk 10, a volatile memory 70, a buffer memory 80, a nonvolatile memory 90, or the like.

Based on the write path information corresponding to the actual write path SWTj−1, the positioning controller 612 generates a target write path TWTj at the time of writing the write track WTj and controls positioning of the write head 15W so as to follow the target write path TWTj. In practice, the write head 15W runs on an actual write path SWTj when writing the write track WTj. The positioning controller 612 acquires, for example, write path information corresponding to the actual write path SWTj, and records the acquired write path information in a memory, for example, the disk 10, the volatile memory 70, the buffer memory 80, the nonvolatile memory 90, or the like.

Based on the write path information corresponding to the actual write path SWTj, the positioning controller 612 generates a target write path TWTj+1 at the time of writing the write track WTj+1 and controls positioning of the write head 15W so as to follow the target write path TWTj+1. In practice, the write head 15W runs on an actual write path SWTj+1 when writing the write track WTj+1. The positioning controller 612 acquires, for example, write path information corresponding to the actual write path SWTj+1, and records the acquired write path information in a memory, for example, the disk 10, the volatile memory 70, the buffer memory 80, the nonvolatile memory 90, or the like.

Figure 12:
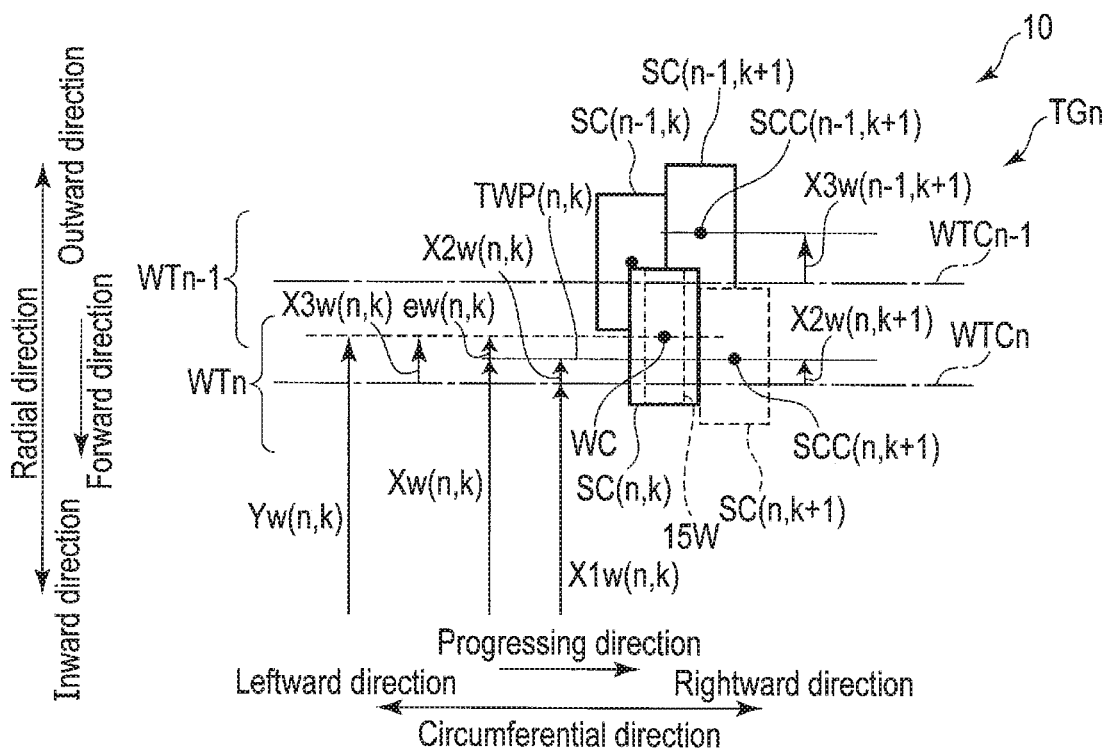
FIG. 12 is a schematic diagram illustrating an example of write ATC control.

FIG. 12 is a schematic diagram illustrating an example of the write ATC control. The example illustrated in FIG. 12 illustrates the write head 15W, a central portion WC of the write head 15W, the write track WTn−1 in a band region TGn, the write track WTn overwritten on a part of the forward direction of the write track WTn−1, a data sector SC (n−1, k) of the write track WTn−1, a next sector SC (n−1, k+1) of the write track WTn−1 positioned (or adjacent) in a progressing direction of the data sector SC (n−1, k), a data sector SC (n, k) of the write track WTn, and a next sector SC (n, k+1) of the write track WTn positioned (or adjacent) in the progressing direction of the data sector SC (n, k). The data sector SC (n, k) is adjacent to the data sector SC (n−1, k) in the forward direction, and the data sector SC (n, k+1) is adjacent to the data sector SC (n−1, k+1) in the forward direction.

In the example illustrated in FIG. 12, the write head 15W writes data to the data sector SC (n, k) of the write track WTn in the band region TGn. The write head 15W writes data to the data sector SC (n, k+1) after writing data to the data sector SC (n, k). FIG. 12 illustrates an initial write position WTCn−1 of the write track WTn−1, the target write position TWP (n, k) in the data sector SC (n, k), the target write position Xw (n, k) in the data sector SC (n, k) corresponding to the target write position TWP (n, k), the write error ew (n, k) which is the difference value between the target write position Xw (n, k) and the actual write position Yw (n, k), the offset value X3w (n, k) which is the difference value between the initial write position X1w (n, k) and the actual write position Yw (n, k), the offset value X3w (n−1, k+1) which is the difference value between the initial write position WTCn−1 of the write track WTn−1 and a radial position of a central portion SCC (n−1, k+1) of (data of) the data sector SC (n−1, k+1), and a write correction value X2w (n, k+1) corresponding to the data sector SC (n, k+1) with respect to the initial write position WTCn of the write track WTn. The target write position TWP (n, k) corresponds to, for example, a radial position of a middle portion of a width in the radial direction of (data of) the data sector SC (n, k). The target write position Xw (n, k), for example, corresponds to a distance in the radial direction from the reference position to the target write position TWP (n, k). The write correction value X2w (n, k+1) corresponds to a difference value between the initial write position WTCn and the radial position of the central portion SCC (n, k+1) in the radial direction of the data sector SC (n, k+1).

In the example illustrated in FIG. 12, the positioning controller 612 acquires the initial write position X1w (n, k) of the data sector SC (n, k), for example, when servo sampling interruption starts. If a flag indicating execution of write ATC control, for example, a bit indicating the execution of the write ATC has been asserted, the positioning controller 612 determines that the write ATC control is being executed. When determining that the write ATC control is being executed, the positioning controller 612 generates the write correction value X2w (n, k) corresponding to the data sector SC (n, k) based on the offset value of (data of) the data sector SC (n−1, k), and acquires the target write position Xw (n, k) by adding the write correction value X2w (n, k) to the initial write position X1w (n, k). The positioning controller 612 acquires the actual write position Yw (n, k). The positioning controller 612 acquires the offset value X3w (n, k) based on the initial write position X1w (n, k) and the actual write position Yw (n, k), and records the offset value X3w (n, k) as the table TB in a memory, for example, the volatile memory 70, the buffer memory 80, or the nonvolatile memory 90. The positioning controller 612 calculates the write error ew (n, k) based on the target write position Xw (n, k) and the actual write position Yw (n, k) and controls the write head 15W so as to be positioned at the target write position Xw (n, k) based on the write error ew (n, k).

For the next servo sampling interruption, the positioning controller 612 acquires the offset value X3w (n−1, k+1) of the data sector (n−1, k+1) adjacent in the opposite direction to the forward direction of the data sector (n, k+1). The positioning controller 612 records the offset value X3w (n−1, k+1), as the write correction value X2w (n, k+1) corresponding to the next sector (n, k+1) positioned in the progressing direction of the data sector SC (n, k), in a memory, for example, the volatile memory 70, the buffer memory 80, the nonvolatile memory 90, or the like.

FIG. 13 is a block diagram illustrating an example of a positioning control system SY1 of a head 15 during write processing according to the second embodiment.

The write control system SY1 further includes a delayer S6, a compensator S7, a calculation unit C131, and a calculation unit C132. The delayer S6, the compensator S7, the calculation unit C131, and the calculation unit C132 are included, for example, in a system controller 130.

The delayer S6, for example, delays an offset value X3w (C, S+1) of (data of) a next sector (C, S+1) positioned in the progressing direction of a current sector (C, S) by one sampling period, and outputs the offset value X3w as the write correction value X2w.

The compensator S7 adjusts a gain and a phase. The compensator S7 includes, for example, a low-pass filter and an attenuator. For example, the compensator S7 adjusts a gain and a phase of an offset value X3w (C−1, S+1)) of (data of) a data sector (C−1, S+1) adjacent in the opposite direction to the forward direction of the next sector (C, S+1).

When a position (C, H, S) for writing data is designated in a particular band region, the position (C, H, S) is input to a converter S1. The converter S1 converts the position (C, H) to the initial write position X1w which is a physical position, and outputs the physical position to the calculation unit C131. The calculation unit C131 generates the target write position Xw, obtained by adding the write correction value X2w (C, S) to the initial write position X1w, and outputs the generated target write position Xw to the calculation unit C131. The calculation unit C132 outputs the write error ew which is the difference value between the target write position Xw and the actual write position Yw to a controller S2. The write error ew is input to the controller S2. The controller S2 outputs the write drive amount Uw to the actuator S3. The actuator S3 is driven according to the write drive amount Uw and moves the head 15, for example, the write head 15W to the actual write position Yw corresponding to the write drive amount Uw. The actuator S3 outputs the actual write position Yw to the calculation units C132 and C62. A memory S4 outputs the offset value X3w (C−1, S+1) of the data sector (C−1, S+1), adjacent in a direction opposite to the progressing direction of the next sector (C, S+1) positioned in the progressing direction of the data sector (C, S) corresponding to the position (C, S), to the compensator S7. The offset value X3w (C−1, S+1) is input to the compensator S7. The compensator S7 outputs the offset value X3w (C−1, S+1) obtained by adjusting the gain and the phase to the delayer S6. The delayer S6 outputs the write correction value X2w (C, S) obtained by delaying the adjusted offset value X3w (C−1, S+1) by one sampling period to the calculation unit C131.

Figure 14:
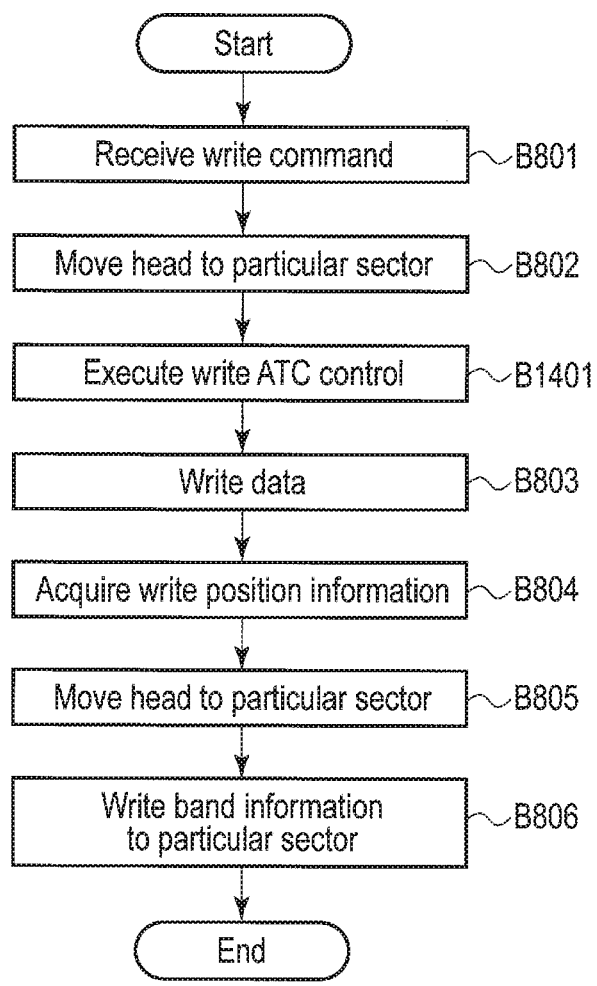
FIG. 14 is a flowchart illustrating an example of a write processing method according to the second embodiment.

FIG. 14 is a flowchart illustrating an example of a write processing method according to the second embodiment.

The system controller 130 receives a write command from a host 100 (B801), and moves the head 15 to a designated particular sector (data sector) (B802). The system controller 130 executes write ATC control (B1401). For example, the system controller 130 asserts a flag, for example, a bit indicating the execution of the write ATC control. The system controller 130 writes data by the write ATC control based on previous write position information (B803). For example, the system controller 130 sequentially writes data from a start track to a last track of a particular band region by the write ATC control based on the previous write position information. The system controller 130 acquires write position information (B804) during the write processing, moves the head 15 to the particular sector (B805), writes the band information to the particular sector (B806), and ends the processing.

Figure 15:
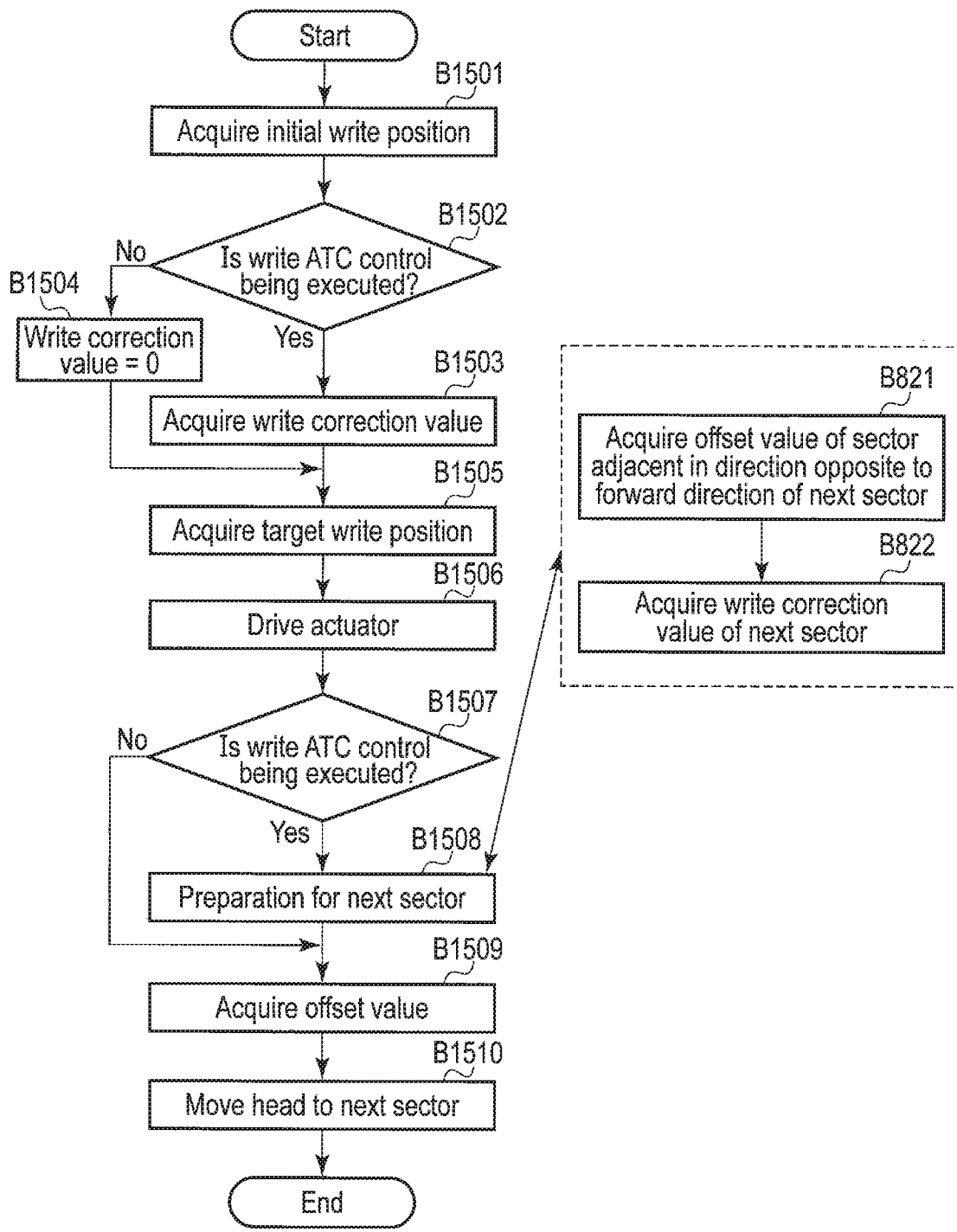
FIG. 15 is a flowchart illustrating an example of head positioning control during write processing.

FIG. 15 is a flowchart, illustrating an example of positioning control of the head 15 during the write processing.

When the servo sampling interruption starts, the system controller 130 acquires an initial write position of a current sector (B1501). The system controller 130 determines whether the write ATC control is being executed (B1502). For example, the system controller 130 determines whether the bit indicating the execution of the write ATC control has been asserted or has not been asserted. When determining that, the write ATC control is being executed (YES in B1502), the system controller 130 acquires a write correction value for an initial write position of the current sector (B1503). For example, when determining that the bit indicating the execution of the write ATC control has been asserted, the system controller 130 acquires the write correction value for the initial write position of the current sector from the table TB. When determining that the write ATC control is not being executed (NO in B1502), the system controller 130 sets the write correction value for the initial write position of the current sector to zero (B1504). For example, when determining that the bit indicating the execution of the write ATC control has been asserted, the system controller 130 sets the write correction value for the initial write position of the current sector to zero.

The system controller 130 acquires a target write position based on the initial write position and the write correction value (B1505). The system controller 130 drives an actuator AC based on the target write position and the actual write position (B1506). For example, the system controller 130 calculates a write error based on the target write position and the actual write position, and drives the actuator AC such that the head 15 is positioned at the target write position based on the write error.

The system controller 130 determines whether the write ATC control is being executed (B1507). When determining that the write ATC control is being executed (YES in B1507), the system controller 130 executes preparation for the next sector positioned in the progressing direction of the current sector (B1508). In preparation for the next sector (B1508), the system controller 130 acquires an offset value of a sector adjacent in the opposite direction to the forward direction of the next sector (B821). The system controller 130 acquires a write correction value corresponding to the next sector based on the offset value of the sector adjacent in the opposite direction to the forward direction of the next sector (B822), and ends the preparation for the next sector (B1508). For example, the system controller 130 acquires the offset value of the sector adjacent in the opposite direction to the forward direction of the next sector as the write correction value corresponding to the next sector, and records the write correction value corresponding to the next sector in a memory, for example, the volatile memory 70, the buffer memory 80, or the nonvolatile memory 90. When determining that the write ATC control is not being executed (NO in B1507), the system controller 130 acquires an offset value of (data of) the current sector (B1509). For example, when determining that the write ATC control is not being executed, the system controller 130 acquires an offset value of (data of) the current sector based on the initial write position and the actual write position, and records the offset value as a table in a memory, for example, the volatile memory 70, the buffer memory 80, or the nonvolatile memory 90. The system controller 130 moves the head 15 to the next sector (B1510), and ends the processing.

According to the second embodiment, the magnetic disk device 1 executes the write ATC control. The magnetic disk device 1 can accurately write a current write track at each circumferential position based on the previous write position information. Therefore, the magnetic disk device 1 can improve the reliability of data.

(First Modification)

A magnetic disk device 1 of a first modification is different from that of the above-described embodiment in terms of a configuration of a read control system SY2.

FIG. 16 is a block diagram illustrating an example of a positioning control system SY2 of a head 15 during read processing according to the first modification.

The read control system SY2 further includes a compensator S7. The compensator S7 is included in a system controller 130, for example.

The compensator 57, for example, adjusts a gain and a phase of a read correction value $X2r$ (C, S+1) of a next sector (C, S+1).

The offset values $X3w$ (C, S+1) and $X3w$ (C+1, S+1) are input to the amplifier A1. The amplifier A1 outputs a read correction value $X2r$ (C, S+1) corresponding to the data sector (C, S+1), obtained by multiplying a value, obtained by adding the offset value $X3w$ (C, S+1) and the offset value $X3w$ (C+1, S+1), by ½ to the compensator S7. The compensator S7 outputs the adjusted read correction value $X2r$ (C, S+1) to a delayer S6. The adjusted read correction value $X2r$ (C, S+1) is input to the delayer S6. The delayer S6 outputs the correction value $X2r$ (C, S) obtained by delaying the read correction value $X2r$ (C, S+1) by one sampling period to the calculation unit C71.

According to the first modification, the magnetic disk device 1 adjusts a read correction value corresponding to the next sector positioned in the progressing direction of the current sector. Therefore, the magnetic disk device 1 can improve read performance.

(Second Modification)

A magnetic disk device 1 of a second modification is different from that of the above-described embodiment and modification in terms of a method of writing band information.

A read/write controller 61 writes band information corresponding to a particular band region to be shifted in a direction opposite to a forward direction in a particular region of a start track of the band region. For example, the read/write controller 61 changes the target write position corresponding to the band information of the particular band region to a radial position shifted in the opposite direction to the forward direction, and writes the band information in a start region based on the changed target write position.

In addition, when the band information is written in a shifted manner, the read/write controller 61 shifts a read head 15R in the particular region of the particular band region in which the band information has been written to read the band information. For example, when the band information has been written to be shifted in the opposite direction to the forward direction, the read/write controller 61 changes a target read position corresponding to the band information of the particular band region to a radial position shifted in the opposite direction to the forward direction, and reads the band information based on the changed target read position.

Figure 17:
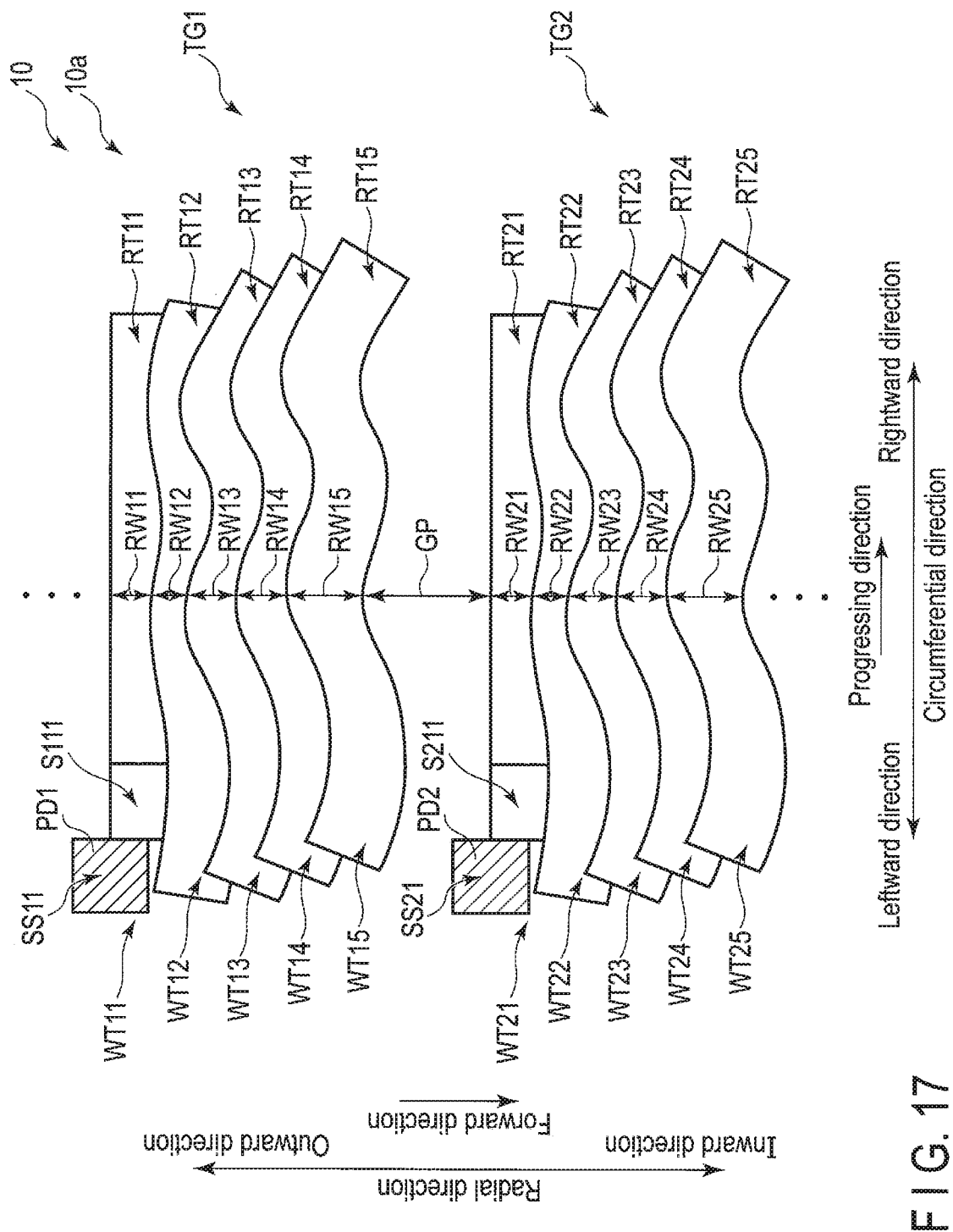
FIG. 17 is a diagram illustrating an example of a method of writing band information according to a second modification.

FIG. 17 is a diagram illustrating an example of a method of writing band information PD1 and PD2 according to the second modification.

For example, the read/write controller 61 starts to acquire write position information from a next sector S111 in the progressing direction of a start sector SS11 of a write track WT11 in a band region TG1 during the write processing, and acquires the write position information in each data sector of the write track WT11 along the progressing direction from the data sector S111. That, is, the read/write controller 61 writes data from the data sector S111 without writing the start sector SS11. In addition, the read/write controller 61 acquires write position information in the write tracks WT11 to WT15. After acquiring the write position information of the write track WT15, the read/write controller 61 writes the band information PD1 including the write position information of the write tracks WT11 to WT15 in the start sector SS11 to be shifted in the opposite direction to the forward direction.

In addition, the read/write controller 61 starts to acquire write position information from a next sector S211 in the progressing direction of a start sector SS21 of a write track WT21 in a band region TG2, and acquires the write position information in each data sector of the write track WT21 along the progressing direction from the data sector S211, which is similar to the band region TG1. After acquiring the write position information of a write track WT25, the read/write controller 61 writes the band information PD2 including the write position information of the write tracks WT21 to WT25 in the start sector SS21 to be shifted in the opposite direction to the forward direction, that is, shifted to the band region TG1 side. Since a gap GP is arranged between the band regions TG1 and TG2, the possibility that the band information is overwritten by another data is low even if the data is shifted in the opposite direction to the forward direction. Since the band information is written to be shifted in the opposite direction to the forward direction, overwriting of the band information on data that has been written in a region adjacent in the forward direction of a particular region of the start track in which the band information has been written is suppressed.

Figure 18:
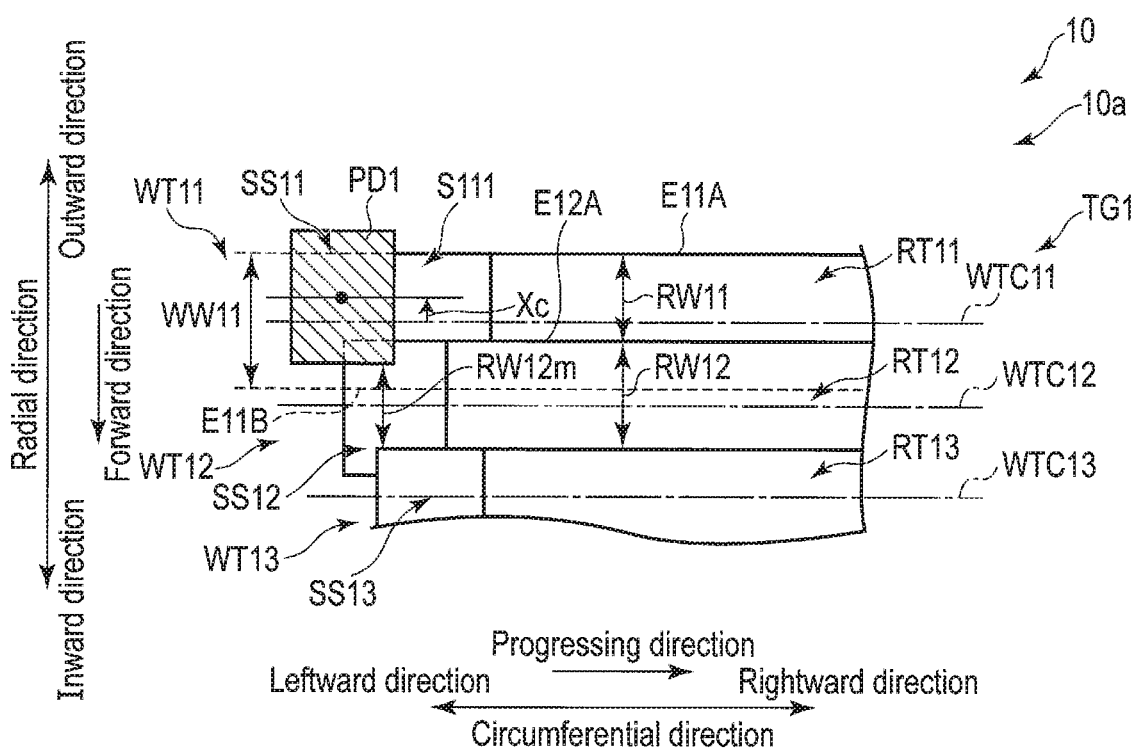
FIG. 18 is a diagram illustrating an example of the method of writing band information according to the second modification.

FIG. 18 is a diagram illustrating an example of a method of writing the band information PD1 according to the second modification. FIG. 18 illustrates a part of the band region TG1 in which the write tracks WT11 to WT13 are overwritten. In FIG. 18, a region except for the start sector SS21 of the write track WT11 is written by positioning the write head 15W at an initial write position WTC11, the write track WT12 is written by positioning the write head 15W at an initial write position WTC12, and the write track WT13 is written by positioning the write head 15W at an initial write position WTC13. In FIG. 18, the initial write position WTC11 corresponds to a target write position in each data sector except for the start sector SS11 of the write track WTC11. The initial write position WTC12 corresponds to a target write position in each data sector of the write track WTC12. The initial write position WTC13 corresponds to a target write position in each data sector of the write track WTC13. In FIG. 18, a read track width RW12$m$ indicates a width in the radial direction of (data of) the data sector SS12 overwritten with the band information PD1. For example, the read track width RW12$m$ corresponds to a threshold of a width in the radial direction that can be read by the read head 15R.

In the example illustrated in FIG. 18, the read/write controller 61 writes the band information PD1 in the start sector SS11 to be shifted by a shift amount Xc in the opposite direction to the forward direction with respect to the target write position corresponding to the start sector SS11, for example, the initial write position WTC11. The shift amount Xc is set within a range of, for example, Xc×RW12$m$−(RW11+RW12−W11). Here, Xc is the shift amount in the radial direction of the band information PD1 in the start sector SS11, RW12$m$ is the threshold of the width in the radial direction that allows data read in the data sector SS12 adjacent in the forward direction of the start sector SS11, RW11 is a width in the radial direction of the remaining region of the data sector SS11 except for a part where the data sector SS12 has been overwritten when writing the data sector SS11 in accordance with the target write position corresponding to the start sector SS11 as usual, and RW12 is a width in the radial direction of the remaining region of (data of) the data sector SS12 except for a part where (data of) a data sector SS13 adjacent in the forward direction of the data sector SS12 has been overwritten when writing the start sector SS11 in accordance with the target write position corresponding to the start sector SS11 as usual. The read/write controller 61 writes the band information in the start sector SS11 to be shifted in the opposite direction to the forward direction by the shift amount Xc, and then, performs writing from the data sector SS111 by positioning the write head 15W at the target write position corresponding to the data sector SS111, for example, the initial write position WTC12.

According to the second modification, the magnetic disk device 1 writes the band information corresponding to the particular band region in the start region to be shifted in the opposite direction to the forward direction. The magnetic disk device 1 can suppress narrowing of the width in the radial direction of data written in the region adjacent in the forward direction of the start region. Therefore, the magnetic disk device 1 can improve read performance.

(Third Modification)

A magnetic disk device 1 of a third modification is different from that of the above-described embodiment and modifications in terms of a method of writing each track of a band region.

A read/write controller 61 writes data to be shifted in a forward direction in each region of each track of a particular band region arranged in the forward direction of a particular region of a start track to write band information corresponding to the band region. For example, the read/write controller 61 changes a target write position in a data sector (hereinafter referred to as an adjustment sector) of a particular track of a particular band region positioned in the forward direction of a start sector to write the band information corresponding to the band region to a radial position shifted in the forward direction, and writes data of the adjustment sector based on the changed target write position. Incidentally, the read/write controller 61 may write a plurality of pieces of data corresponding to a plurality of adjustment sectors, respectively, in a particular band region to be shifted by the same shift amount in the forward direction, or to be shifted by different shift amounts in the forward direction.

When the data of the adjustment sector has been written in a shifted manner, the read/write controller 61 shifts a read head 15R in the adjustment sector to read the data of the adjustment sector. For example, when the data of the adjustment sector has been written to be shifted in the forward direction, the read/write controller 61 changes a target read position of the data of this adjustment sector to a radial position shifted in the forward direction, and reads the data of the adjustment sector based on the changed target read position.

Figure 19:
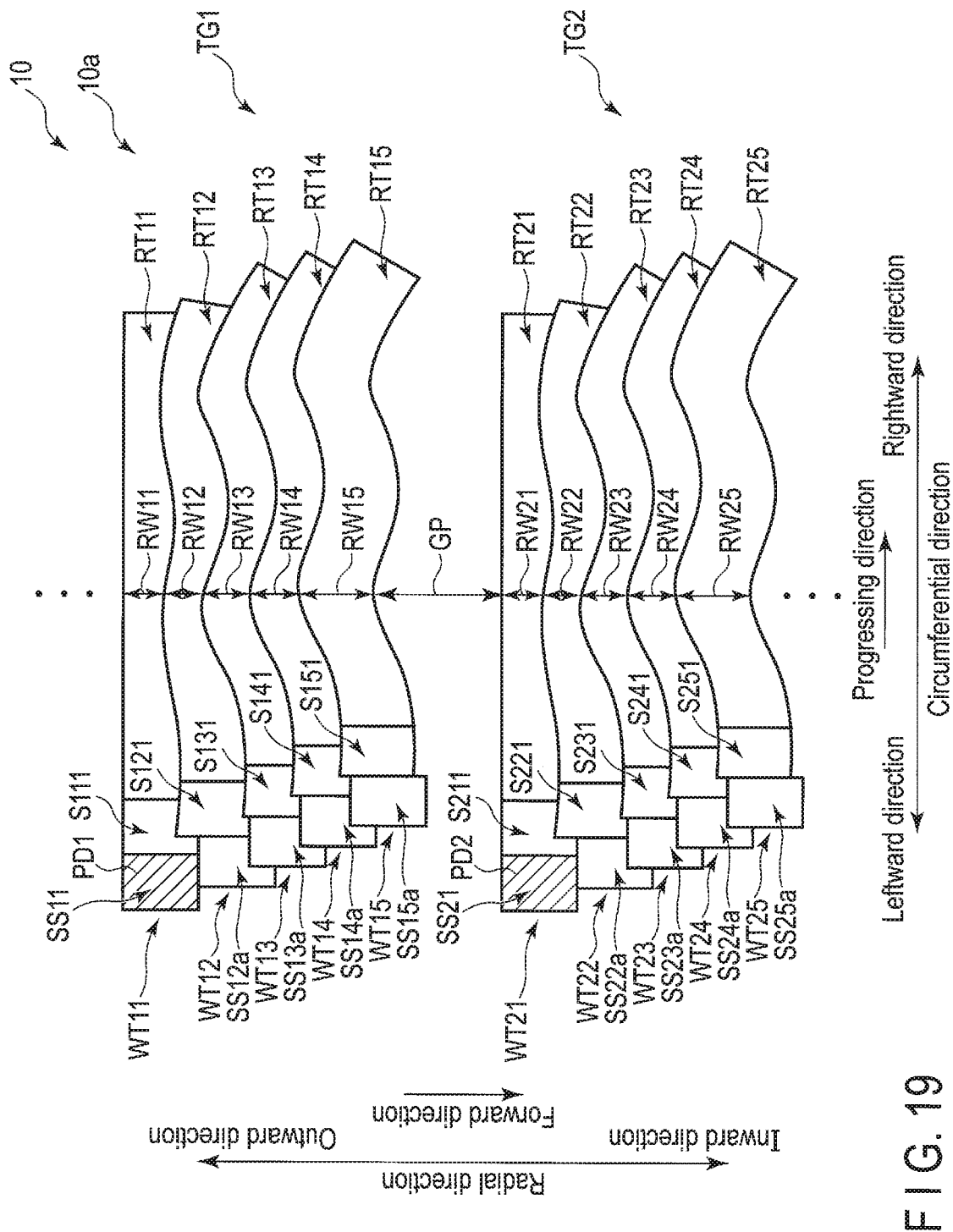
FIG. 19 is a diagram illustrating an example of a method of writing each track of a band region according to a third modification.

FIG. 19 is a diagram illustrating an example of a method of writing each track of band regions TG1 and TG2 according to the third modification.

In FIG. 19, a write track WT11 and a read track RT11 include a start sector SS11 and a next sector S111 positioned in the progressing direction of the start sector SS11. A write track WT12 and a read track RT12 include an adjustment sector SS12$a$ adjacent in the forward direction of the start sector SS11 and a next-sector S121 positioned in the progressing direction of the adjustment sector SS12$a$. A write track WT13 and a read track RT13 include an adjustment sector SS13$a$ adjacent in the forward direction of the adjustment sector SS12$a$ and a next sector S131 positioned in the progressing direction of the adjustment sector SS13$a$. A write track WT14 and a read track RT14 include an adjustment sector SS14a adjacent in the forward direction of the adjustment sector SS13a and a next sector S141 positioned in the progressing direction of the adjustment sector SS14a. A write track WT15 and a read track RT15 include an adjustment sector SS15a adjacent in the forward direction of the adjustment sector SS14a and a next sector S151 positioned in the progressing direction of the adjustment sector SS15a.

In FIG. 19, a write track WT21 and a read track RT21 include a start sector SS21 and a next sector S211 positioned in the progressing direction of the start sector SS21. A write track WT22 and a read track RT22 include an adjustment sector SS22a adjacent in the forward direction of the start sector SS21 and a next sector S221 positioned in the progressing direction of the adjustment sector SS22a. A write track WT23 and a read track RT23 include an adjustment sector SS23a adjacent in the forward direction of the adjustment sector SS22a and a next sector S131 positioned in the progressing direction of the adjustment sector SS23a. A write track WT24 and a read track RT24 include an adjustment sector SS24a adjacent in the forward direction of the adjustment sector SS23a and a next sector S241 positioned in the progressing direction of the adjustment sector SS24a. A write track WT25 and a read track RT25 include an adjustment sector SS25a adjacent in the forward direction of the adjustment sector SS24a and a next sector S251 positioned in the progressing direction of the adjustment sector SS25a.

For example, the read/write controller 61 writes data in each data sector along the progressing direction from the data sector S111 in the write track WT11 in the band region TG1. While data is written to the write track WT11, the read/write controller 61 starts to acquire the write position information in each data sector from the data sector S111 along the progressing direction in the write track WT11. In the write track WT12, the read/write controller 61 writes the adjustment sector SS12a to be shifted in the forward direction with respect to the target write position in the adjustment sector SS12a, and writes data from the data sector S121 based on the target write position. In the write track WT13, the read/write controller 61 writes the adjustment sector SS13a to be shifted in the forward direction with respect to the target write position in the adjustment sector SS13a, and writes data from the data sector S131 based on the target write position. In the write track WT14, the read/write controller 61 writes the adjustment sector SS14a to be shifted in the forward direction with respect to the target write position in the adjustment sector SS14a, and writes data from the data sector S141 based on the target write position. In the write track WT15, the read/write controller 61 writes the adjustment sector SS15a to be shifted in the forward direction with respect to the target, write position in the adjustment sector SS15a, and writes data from the data sector S151 based on the target write position. The read/write controller 61 acquires write position information in the write tracks WT12 to WT15. After acquiring the write position information of the write track (last track) WT15, the read/write controller 61 writes band information PD1 including the write position information of the write tracks WT11 to WT15 in the start sector SS11.

The read/write controller 61 writes data to each of the write tracks WT21 to WT25 of the band region TG2, and acquires write position information from each of the write tracks WT21 to WT25 of the band region TG2, which is similar to the band region TG1. After acquiring the write position information of the write track (last track) WT25, the read/write controller 61 writes the band information PD2 including the write position information of the write tracks WT21 to WT25 in the start sector SS21.

Figure 20:
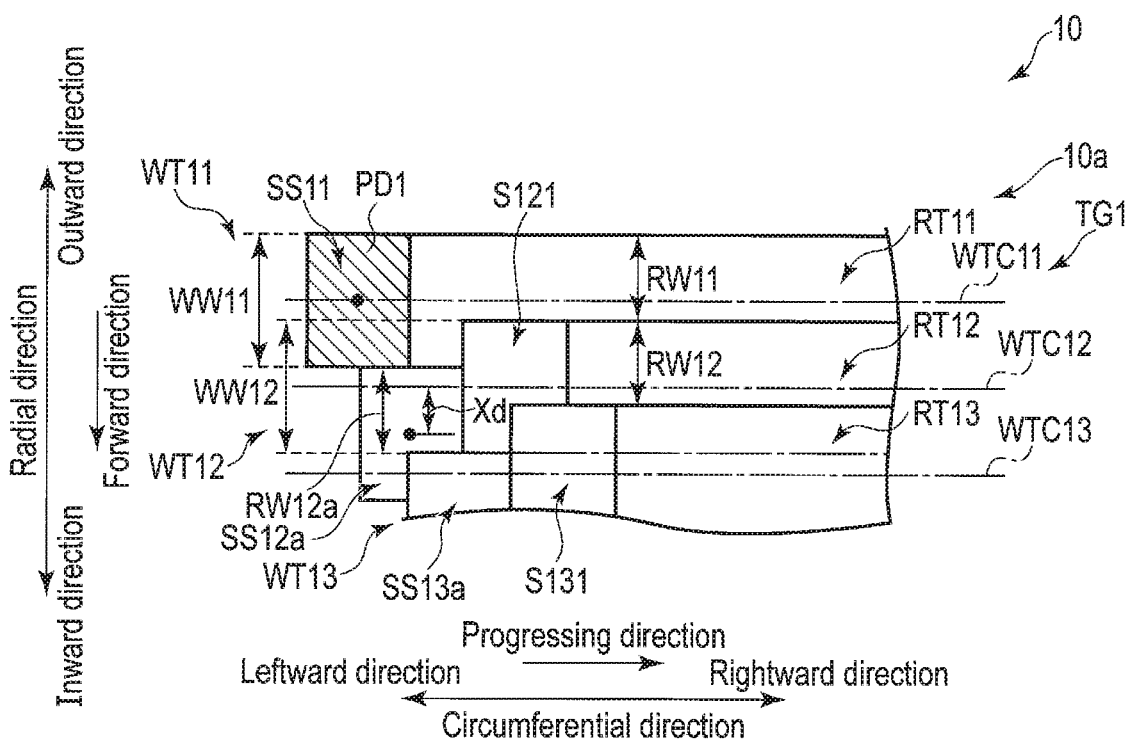
FIG. 20 is a diagram illustrating an example of a method of writing the track of the band region according to the third modification.

FIG. 20 is a diagram illustrating an example of a method of writing the track of the band region TG1 according to the third modification. FIG. 20 illustrates a part of the band region TG1 in which the write tracks WT11 to WT13 are overwritten. In FIG. 20, a region except for the adjustment sector SS12a of the write track WT12 is written by positioning a write head 15W at an initial write position WTC12, and a region except for the adjustment sector SS13a of the write track WT13 is written by positioning the write head 15W at an initial write position WTC13. In FIG. 20, an initial write position WTC11 corresponds to a target write position of the write track WT11, the initial write position WTC12 corresponds to a target write position of the write track WT12, and the initial write position WTC13 corresponds to a target write position of the write track WTC13.

In the example illustrated in FIG. 20, the read/write controller 61 writes data in the adjustment sector SS12a to be shifted by a shift amount Xd in the forward direction with respect to the target write position corresponding to the adjustment sector SC12a, for example, the initial write position WTC12. The shift amount Xd is set within a range of, for example, Xd×WW12−RW12a. Here, Xd is a shift amount in the radial direction of data of the adjustment sector SS12a adjacent in the forward direction of the start sector SS11 in which the band information PD1 has been written, WW12 is a width in the radial direction of data of the adjustment sector SS12a of the write track WT12 when writing to the adjustment sector SS12a without shifting with respect to the target write position, and RW12a is a width in the radial direction of data of the adjustment sector SS12a of the read track RT12. The read/write controller 61 writes data in the adjustment sector SS12a to be shifted in the forward direction by the shift amount Xd, and then, performs writing from the data sector SS121 by positioning the write head 15W at the target write position corresponding to the data sector SS121, for example, the initial write position WTC12. The read/write controller 61 writes another write track positioned in the forward direction of the write track WT12 in the same manner as in the write track WT12.

According to the third modification, the magnetic disk device 1 writes the respective regions of the particular band region arranged in the forward direction of the start region to write the band information corresponding to the particular band region to be shifted in the forward direction. The magnetic disk device 1 can write the band information in the start region without shifting the band information in the radial direction. Therefore, the magnetic disk device 1 can improve read performance.

(Fourth Modification)

A magnetic disk device 1 of a fourth modification is different from that of the above-described embodiment and modifications in terms that data is not written in a region adjacent to a region where band information corresponding to a band region is written.

The read/write controller 61 does not write data in a particular region (hereinafter referred to as an unwritten region) adjacent in the forward direction of a particular region of the start track to write the band information corresponding to the particular band region, for example, a data sector (hereinafter referred to as an unwritten sector). In other words, the read/write controller 61 writes data to a region except for the unwritten region in a track adjacent in the forward direction of the start track. For example, the read/write controller 61 reads data in a region except for the unwritten region in the track adjacent in the forward direction of the start track.

Figure 21:
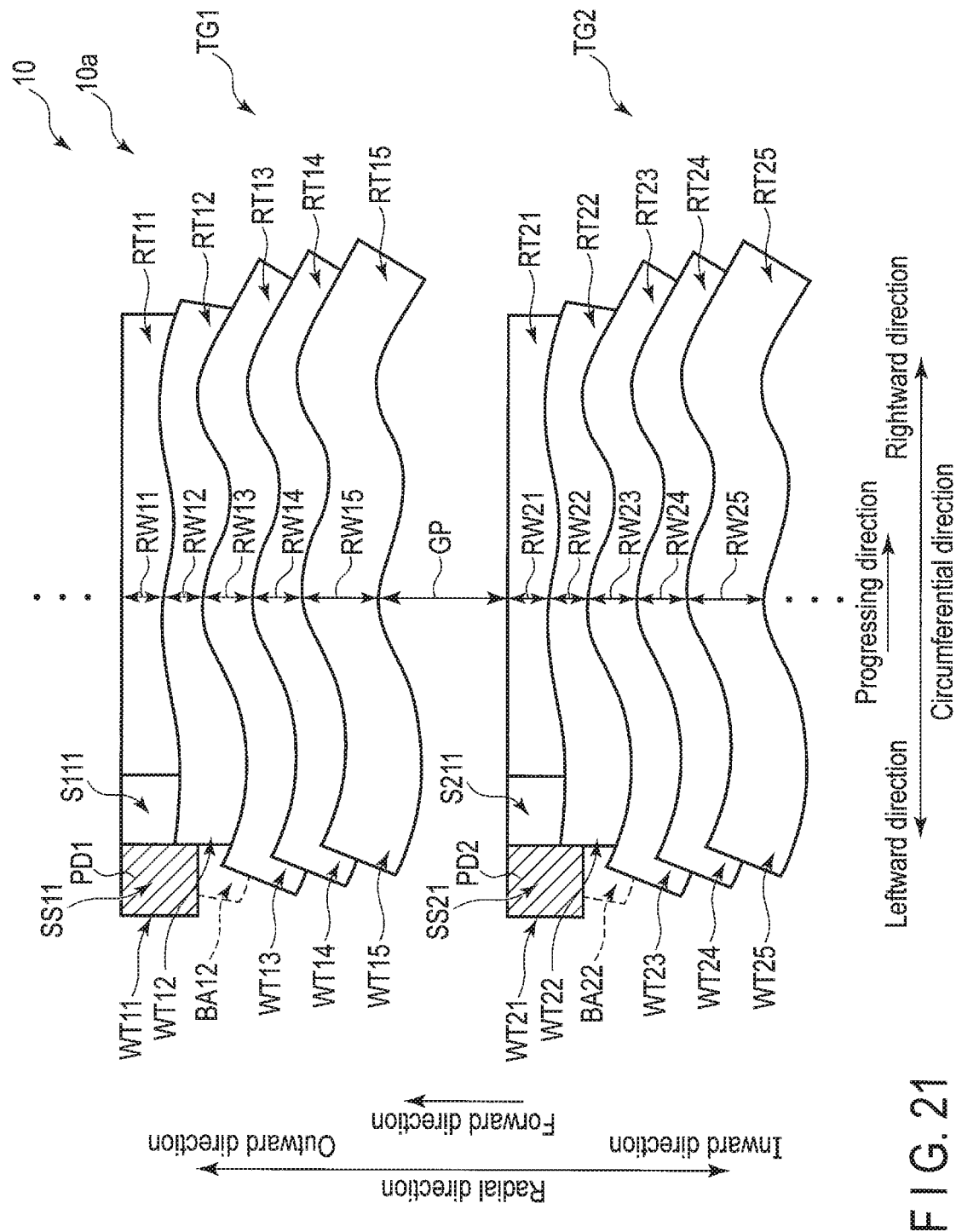
FIG. 21 is a diagram illustrating an example of a method of writing each track of a band region according to a fourth modification.

FIG. 21 is a diagram illustrating an example of a method of writing each track of the band regions TG1 and TG2 according to the fourth modification. In FIG. 21, the write track WT12 and the read track RT12 include an unwritten sector BA12. The write track WT22 and the read track RT22 include an unwritten sector BA22.

In the write track WT12 of the band region TG1, the read/write controller 61 writes data in a region of the write track WT12 except for the unwritten sector BA12 adjacent in the forward direction of the start sector SS11.

The read/write controller 61 writes data in a region except for the unwritten sector BA22 of the write track WT22 adjacent in the forward direction of the start sector SS21 in the write track WT22 of the band region TG2, which is similar to the band region TG1.

According to the fourth modification, the magnetic disk device 1 writes the band information corresponding to the particular band region in the start region. The magnetic disk device 1 does not write data to the unwritten region adjacent in the forward direction of the start region. The magnetic disk device 1 can write the band information without shifting the band information in the radial direction. Therefore, the magnetic disk device 1 can improve read performance.

(Fifth Modification)

A magnetic disk device 1 of a fifth modification is different from that of the above-described embodiment and modifications in terms that a forward direction is different between write processing and read processing.

A read/write controller 61 has a forward direction during the write processing different from a forward direction during the read processing. The read/write controller 61 rearranges data to be written to a particular band region sent from a host 100 in a memory, for example, a buffer memory 80 or the like in the order from data to be read last during the read processing, which is the data to be written in the particular band region sent from the host 100, for example, data (hereinafter referred to as last data) corresponding to a logical address of the largest number among logical addresses of data to be written to the particular band region sent from the host 100, to the foremost, data. During the write processing, the read/write controller 61 writes data to each track in the particular band region using a direction from an inward direction to an outward direction as the forward direction. In one example, the read/write controller 61 writes data sent from the host 100 in the order from the last data to the foremost data in each track of the particular band region during the write processing using the direction from the inward direction to the outward direction as the forward direction. The read/write controller 61 acquires each write position information of each track in the particular band region using the direction from the inward direction to the outward direction as the forward direction. The read/write controller 61 writes band information corresponding to this band region in a final track in the particular band region. In the fifth modification, the final track corresponds to the above-described start track. Therefore, the final track is first read, for example, when reading the particular band region. As data is written in this manner, overwriting of the band information on data that has been written in a region adjacent in the forward direction of a particular region of the start track in which the band information has been written is suppressed.

During the read processing, the read/write controller 61 reads data that has been written to each track in the particular band region using a direction from the outside direction to the inward direction as the forward direction. In one example, the read/write controller 61 first reads band information, and reads data in the order from the foremost data to the last data based on the band information from each track in the particular band region using a direction from the outward direction to the inward direction as the forward direction, during the read processing.

Figure 22:
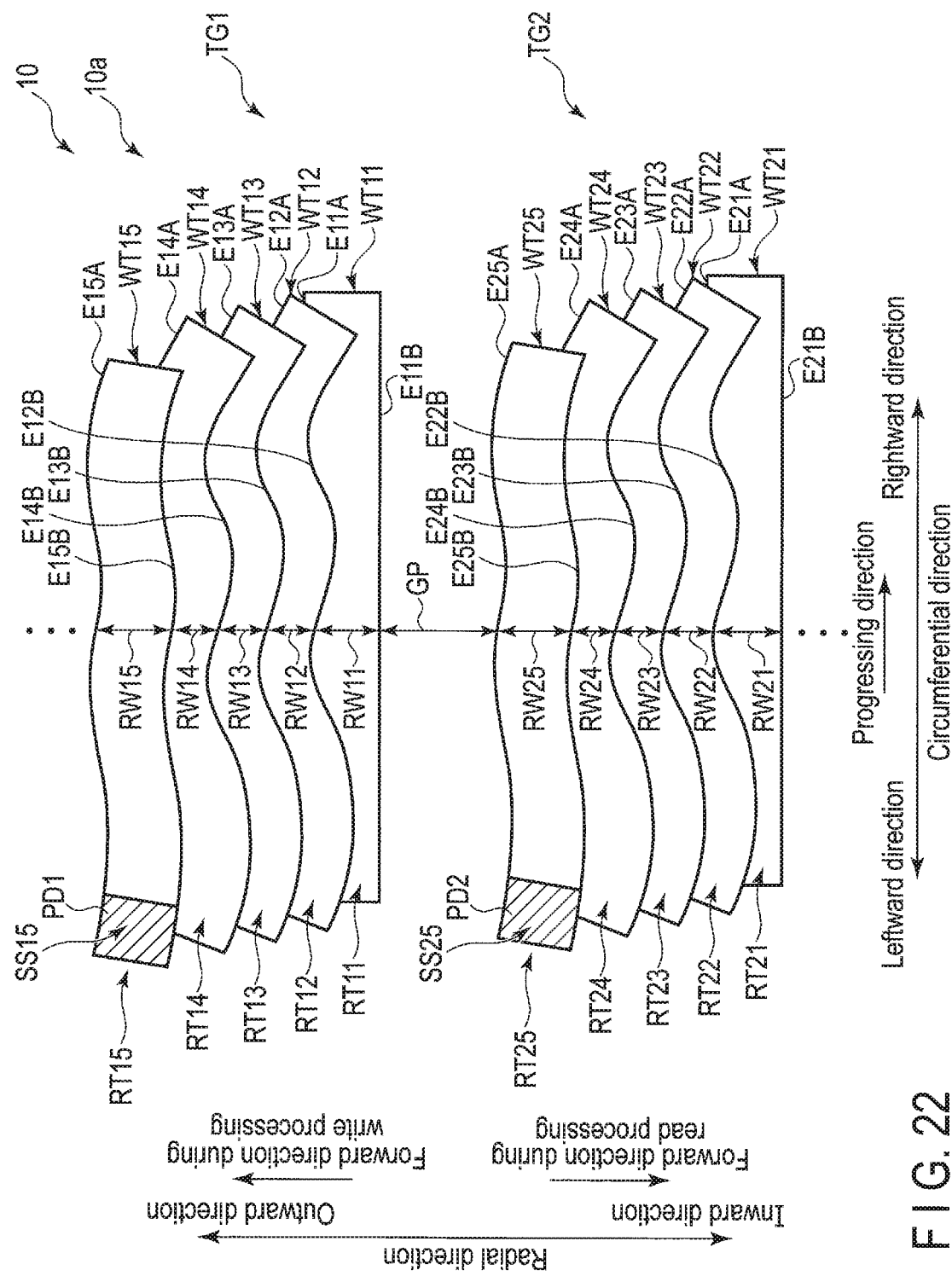
FIG. 22 is a diagram illustrating an example of a method of writing each track of a band region according to a fifth modification.

FIG. 22 is a diagram illustrating an example of a method of writing each track of band regions TG1 and TG2 according to the fifth modification.

For example, the read/write controller 61 writes data from the last data to the foremost data in each track from a write track WT11 to a write track WT15 from the inward direction to the outward direction in the band region TG1, and acquires the write position information in each track. After acquiring the write position information of the write track (last track) WT15, the read/write controller 61 writes the banc information PD1 including each write position information of the write tracks WT11 to WT15 in the start sector SS15 of the write track WT15. For example, the read/write controller 61 reads the band information PD1 in the start sector SS15, and performs reading in the order of read tracks RT15, RT14, RT13, RT12, and RT11 based on the band information PD1 from the outward direction to the inward direction.

In addition, the read/write controller 61 writes data from the last data to the foremost data in each track from a write track WT21 to a write track WT25 from the inward direction to the outward direction in the band region TG2, for example, and acquires the write position information in each track, which is similar to the band region TG1. After acquiring the write position information of the write track (last track) WT25, the read/write controller 61 writes the band information PD2 including each write position information of the write tracks WT21 zo WT25 in the start sector SS25 of the write track WT25. For example, the read/write controller 61 reads the band information PD2 in the start sector SS25, reads the read track RT25 based on the band information PD2 from the outward direction to the inward direction, and performs reading in the order of the read tracks RT25, RT24, RT23, RT22, and RT21 from the outward direction to the inward direction.

Figure 23:
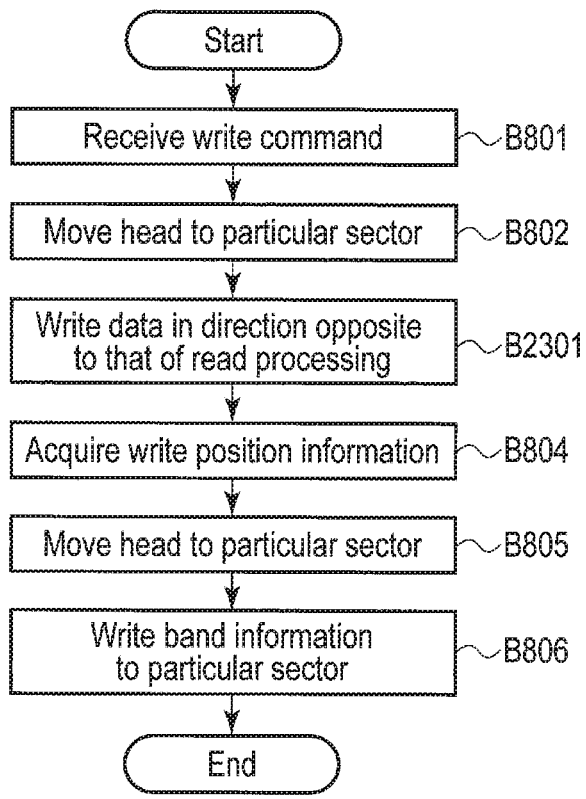
FIG. 23 is a flowchart illustrating an example of a write processing method according to the fifth modification.

FIG. 23 is a flowchart illustrating an example of a write processing method according to the fifth modification.

The system controller 130 receives a write command from a host 100 (B801), and moves the head 15 to a designated particular sector (data sector) (B802). The system controller 130 writes data in a direction opposite to that of the read processing in the radial direction (B2301). For example, the system controller 130 rearranges the data to be written in the particular band region sent from the host 100 in the order of the last data to the foremost data, and sequentially writes data from last data to the foremost data in each track of the band region in the direction opposite to that of the read processing in the radial direction. The system controller 130 writes data (B803), acquires write position information during the write processing (B804), moves the head 15 to a particular sector (B805), writes band information in the particular sector (B806), and ends the processing.

Figure 24:
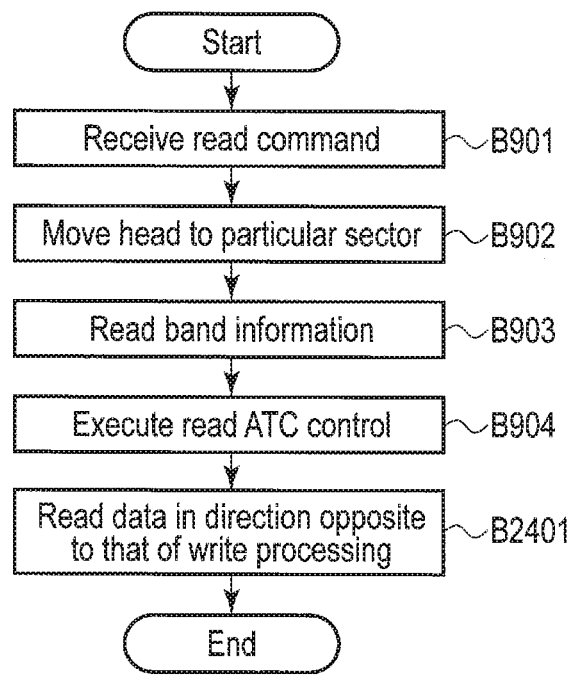
FIG. 24 is a flowchart illustrating an example of a read processing method according to the fifth modification.

FIG. 24 is a flowchart illustrating an example of a read processing method according to the fifth modification.

The system controller 130 receives a read command from the host 100 (B901). The head 15 is moved to a particular sector of the designated particular band region (B902), the band information written in the particular sector is read (B903), and the read ATC control is executed (B904). The system controller 130 reads data in the direction opposite to that of the write processing in the radial direction (B2401) and ends the processing. For example, the system controller 130 sequentially reads data from the foremost data to the last data from each track in the band region in the direction opposite to that of the write processing in the radial direction.

According to the fifth modification, the forward direction of the magnetic disk device 1 is different between the write processing and the read processing. The magnetic disk device 1 writes the band information in the start region. The magnetic disk device 1 can write the band information in the start region without overwriting the band information on the data written in the region adjacent in the forward direction of the start region. In the particular band region, the magnetic disk device 1 can write the band information corresponding to this band region in the start sector without seeking the head 15 to another track after acquiring the write position information of the last track. After writing the band information of the particular band region, the magnetic disk device 1 can read the band information corresponding to this band region without seeking the head 15 to another track and execute the read processing of this band region based on this band information. Therefore, the magnetic disk device 1 can improve read performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head configured to write data to the disk and read data from the disk; and
a controller configured to write position information of the head when writing a first track of the disk and a second track partially overwritten on the first track in a first region of the first track at which sequential reading of the first track and the second track is started.

2. The magnetic disk device according to claim 1, wherein the controller writes the position information to be shifted in an opposite direction from the second track.

3. The magnetic disk device according to claim 1, wherein the controller writes data in a third region of the second track except for a second region of the second track adjacent in a radial direction of the disk in the first region.

4. The magnetic disk device according to claim 1, wherein the controller writes data to be shifted in an opposite direction from the first track in a second region of the second track adjacent in a radial direction of the disk in the first region.

5. The magnetic disk device according to claim 1, wherein the controller controls the head with a second threshold that allows a shift of the head in a direction of the second track, the second threshold smaller than a first threshold that allows a shift of the head in an opposite direction from the second track, to write data.

6. The magnetic disk device according to claim 1, wherein the controller writes the second track based on first position information when writing the first track within the position information.

7. The magnetic disk device according to claim 1, wherein the controller reads the position information in the first region, writes the second track based on first position information when writing the first track within the position information, and reads the first track based on the first position information and second position information when writing the second track within the position information.

8. The magnetic disk device according to claim 7, wherein when reading a fourth region except for the first region of the first track, the controller reads the fourth region based on an average value of a first position of the head when writing data in the fourth region and a second position when writing data in a fifth region of the second track adjacent to the fourth region in a radial direction.

9. A read/write processing method that is applied to a magnetic disk device comprising a disk and a head configured to write data to the disk and read data from the disk, the read/write processing method comprising
writing position information of the head when writing a first track of the disk and a second track partially overwritten on the first track in a first region of the first track at which sequential reading of the first track and the second track is started.

10. The read/write processing method according to claim 9, further comprising:
writing the position information to be shifted in an opposite direction from the second track.

11. The read/write processing method according to claim 9, further comprising:
writing data in a third region of the second track except for a second region of the second track adjacent in a radial direction of the disk in the first region.

12. The read/write processing method according to claim 9, further comprising:
writing data to be shifted in an opposite direction from the first track in a second region of the second track adjacent in a radial direction of the disk in the first region.

13. The read/write processing method according to claim 9, further comprising:
controlling the head with a second threshold that allows a shift of the head in a direction of the second track, the second threshold smaller than a first threshold that allows a shift of the head in an opposite direction from the second track, to write data.

14. The read/write processing method according to claim 9, further comprising:
writing the second track based on first position information when writing the first track within the position information.

15. The read/write processing method according to claim 9, further comprising:
reading the position information in the first region,
writing the second track based on first position information when writing the first track within the position information; and
reading the first track based on the first position information and second position information when writing the second track within the position information.

16. The read/write processing method according to claim 15, further comprising:
when reading a fourth region except for the first region of the first track, reading the fourth region based on an average value of a first position of the head when writing data in the fourth region and a second position when writing data in a fifth region of the second track adjacent to the fourth region in a radial direction.

* * * * *